(12) United States Patent
Kostrzewski et al.

(10) Patent No.: US 8,798,148 B2
(45) Date of Patent: Aug. 5, 2014

(54) APPARATUS AND METHOD EMPLOYING PRE-ATR-BASED REAL-TIME COMPRESSION AND VIDEO FRAME SEGMENTATION

(75) Inventors: Andrew Kostrzewski, Garden Grove, CA (US); Tomasz Jannson, Torrance, CA (US); Wenjian Wang, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 1462 days.

(21) Appl. No.: 11/818,847

(22) Filed: Jun. 15, 2007

(65) Prior Publication Data

US 2008/0310742 A1 Dec. 18, 2008

(51) Int. Cl.
*H04N 7/12* (2006.01)
*H04N 11/02* (2006.01)
*H04N 11/04* (2006.01)

(52) U.S. Cl.
USPC ............ 375/240.14; 375/240.12; 375/240.13; 375/240.15

(58) Field of Classification Search
USPC ............... 382/173, 233; 375/E7.211, 240.03, 375/240.11–240.15
See application file for complete search history.

(56) References Cited

U.S. PATENT DOCUMENTS

| | | | |
|---|---|---|---|
| 5,631,975 | A | 5/1997 | Riglet et al. |
| 5,654,771 | A | 8/1997 | Tekalp et al. |
| 5,710,829 | A | 1/1998 | Chen et al. |
| 5,750,925 | A | 5/1998 | Purdom |
| 5,768,413 | A | 6/1998 | Levin et al. |
| 5,912,980 | A * | 6/1999 | Hunke .......................... 382/103 |
| 5,970,173 | A | 10/1999 | Lee et al. |
| 6,137,912 | A | 10/2000 | Kostrzewski et al. |

(Continued)

OTHER PUBLICATIONS

H. Olkkonen, P. Pesola, "Gaussian Pyramid Wavelet Transform for Multiresolution Analysis of Images", Graphical Models and Image Processing vol. 58, Issue 4, Jul. 1996, pp. 394-398 [retrieved from Science Direct database on Dec. 18, 2011].*

(Continued)

*Primary Examiner* — Andy Rao
*Assistant Examiner* — Feliciano Mejia
(74) *Attorney, Agent, or Firm* — Sheppard Mullin Richter & Hampton LLP

(57) ABSTRACT

One subject of this invention is the development of a novel region of interest (ROI) method, or Frame Segmentation Method that can be provided within a video stream, in real-time, or more precisely within a few milliseconds of video frame duration of 30 msec, or even in the sub-millisecond range. This video frame segmentation is the basis of Pre-ATR-based Ultra-Real-Time (PATURT) video compression. Still other subjects of this invention are morphing compression, and watermarking, also based on the PATURT. The applications of the PATURT innovation include ROI-based real-time video recording that has special applications for aircraft pilot/cockpit video recording in "black-box" devices, recording aircraft accidents, or catastrophes. Such black-box devices usually need to pass high impact (3400 g), high temperature (1100° C., in 1 h), and other harsh environmental tests. In this invention, they also have the capability of reporting the last cockpit events up to 0.5 seconds before an accident, including all cockpit sensor readings, as well as pilots' behavior, the latter with fully scrambled and non-recoverable facial information. Further applications include video surveillance. The latter can be also applied to missile defense (recognizing real target or real missile, from false targets (decoys)), or to other Ultra-Real-Time (URT) civilian and military scenarios.

21 Claims, 16 Drawing Sheets

(56) References Cited

U.S. PATENT DOCUMENTS

| | | | |
|---|---|---|---|
| 6,167,155 | A | 12/2000 | Kostrzewski et al. |
| 6,256,423 | B1 * | 7/2001 | Krishnamurthy et al. .... 382/251 |
| 6,285,794 | B1 | 9/2001 | Georgiev et al. |
| 6,404,920 | B1 | 6/2002 | Hsu |
| 6,453,074 | B1 | 9/2002 | Zheng |
| 6,477,314 | B1 | 11/2002 | Tai |
| 6,487,312 | B2 | 11/2002 | Kostrzewski et al. |
| 6,628,716 | B1 | 9/2003 | Tan et al. |
| 6,687,405 | B1 | 2/2004 | Trew et al. |
| 6,973,213 | B2 | 12/2005 | Fan et al. |
| 6,983,018 | B1 | 1/2006 | Lin et al. |
| 7,010,164 | B2 | 3/2006 | Weese et al. |
| 7,027,719 | B1 | 4/2006 | Schneider et al. |
| 7,088,845 | B2 | 8/2006 | Gu et al. |
| 7,796,841 | B2 * | 9/2010 | Paillet et al. .................. 382/312 |
| 2002/0164074 | A1 | 11/2002 | Matsugu et al. |
| 2005/0193311 | A1 | 9/2005 | Das et al. |
| 2005/0207500 | A1 | 9/2005 | Bober |
| 2006/0045381 | A1 | 3/2006 | Matsuo et al. |
| 2007/0046821 | A1 | 3/2007 | Mead et al. |
| 2007/0098213 | A1 | 5/2007 | Rhoads |
| 2007/0130599 | A1 | 6/2007 | Monroe |

OTHER PUBLICATIONS

Muguira, Maritza Rosa; Russ, Trina Denise, "Extracting meaningful information from video sequences for intelligent searches", Sandia National Laboratories Report, Feb. 2005. [retrieved from Internet "http://prod.sandia.gov/techlib/access-control.cgi/2005/050779.pdf" on Dec. 18, 2011].*

Song, B., Beom Ra, J. "Automatic Shot Change Detection Algorithm Using Multi-stage Clustering for MPEG-Compressed Videos", Journa of Visual Communication and Image Representation 12, 364-385 (2001) [retreived from Internet "http://www-isl.kaist.ac.kr/Papers/IJ/47_Sep2001_JVCIR_bcsong.pdf" on Dec. 18, 2011].*

Jacob Ström, Pamela C. Cosman, "Medical Image Compression with Lossless Regions of Interest", Signal Processing vol. 59, Issue 2, Jun. 1997, pp. 155-171 [retrieved from ScienceDirect database on Dec. 18, 2011].*

Michael McGuffin, Ravin Balakrishnan, "Acquisition of expanding targets", Proceeding CHI '02 Proceedings of the SIGCHI conference on Human factors in computing systems: Changing our world, changing ourselves ACM New York, NY, USA ©2002 [retrieved from ACM database on Dec. 18, 2011].*

Swanson, M.D.; Kobayashi, M.; Tewfik, A.H.;"Multimedia data-embedding and watermarking technologies", Proceedings of the IEEE, Jun. 1998; vol. 86 Issue:6; pp. 1064-1087 [retreived from IEEE database on Dec. 18, 2011].*

Jue Wang; Liang Ji;"A region and data hiding based error concealment scheme for images", IEEE Transactions on Consumer Electronics, May 2001 vol. 47 Issue:2; pp. 257-262 [retrieved from IEEE databse on Dec. 18, 2011].*

Azzedine Boukerche, Tingxue Huang, Richard W. Nelem Pazzi, "A real-time transport protocol for image-based rendering over heterogeneous wireless networks", MSWiM '05: Proceedings of the 8th ACM international symposium on Modeling, analysis and simulation of wireless and mobile systems, Oct. 2005 [retrieved from ACM database on Dec. 18, 2011].*

By Il Kyu Eom , Yoo Shin Kim, "Wavelet-Based Bayesian Denoising Using Bernoulli-Gaussian Mixture Model", Visual Communication and Image Processing 2005, Proc of SPIE vol. 5960; pp. 316-324 [retrieved from CiteSeer database].*

Israeli Examination Report, App. No. 201837, mailed Oct. 31, 2012 Title: Apparatus and Method Employing Pre-Atr-Based Real-Time Compression and Video Frame Segmentation, Applicant: Physical Optics Corporation.

Sensor and Data Fusion by L.A. Klein, SPIE Press (2004).

Multisensor Data Fusion by E.Waltz and J. Llinas, Artech House (1990).

Mobile Acoustic Sensor System for Road-Edge Detection by T. Jannson et al, SPIE Proc., vol. 6201-36 (2006).

Real-Time Pre-ATR Video Data Reduction in Wireless Networks by T. Jannson et al, SPIE Proc., vol. 6234-22 (2006).

Video Frame Segmentation Using Competitive Contours, by Piotr Ste'C and Marek Doma'Nski, Eusipco (2005).

Introduction to M PEG-7 by B.S. Manjunath, P.S. Salembier and T. Sikura, Wiley (2002).

Analog Devices Video Codec Chips Including ADV202, ADV601 and ADV611/612, http://www.analog.com/en/cat/0,2878,765,00.html.

Introduction to Fourier Optics by J.W. Goodman, 2nd ed., McGraw Hill (1998).

Soft Computing and Soft Communication (SC2) for Synchronized Data by T. Jannson et al, Invited Paper, SPIE Proc., vol. 3812, pp. 55-67 (1999).

Applications of Geometric Algebra in Robot Vision by Gerald Sommer, Computer Algebra and Geometric Algebra with Applications, vol. 3519 (2005).

Edge Flow: A Framework of Boundary Detection and Image Segmentation by W.Y. MA and B.S. Mannjunath, IEEE Computer Vision and Pattern Recognition (1997).

A Computational Approach to Edge Detection by J. Canny, IEEE Trans. Pattern Analysis and Machine Intelligence, 8:679-714 (1986).

Bayesian Inference and Conditional Possibilities As Performance Metrics for Homeland Security Sensors by T. Jannson, SPIE Proc., pp. 6538-6539 (2007).

Gradient Vector Flow Deformable Models by C. Xu and J.L. Prince, Handbook of Medical Imaging, Academic Press, edited by Issac Bankman (Sep. 2006).

Digital Image Processing by R.C. Gonzalez and R.E. Woods, 2nd Edition (2002).

Fuzzy Logic and NeuroFuzzy Applications Explained by C. Von Altrock, ISBN 0-13-368465-2 (2002).

Image Restoration Using Gaussian Scale Mixtures in Overcomplete Oriented Pyramids by J. Portilla, SPIE Proc., vol. 5914-50 (2005).

Geometric Invariance in Computer Vision by Mundy et al, The MIT Press (1992).

* cited by examiner

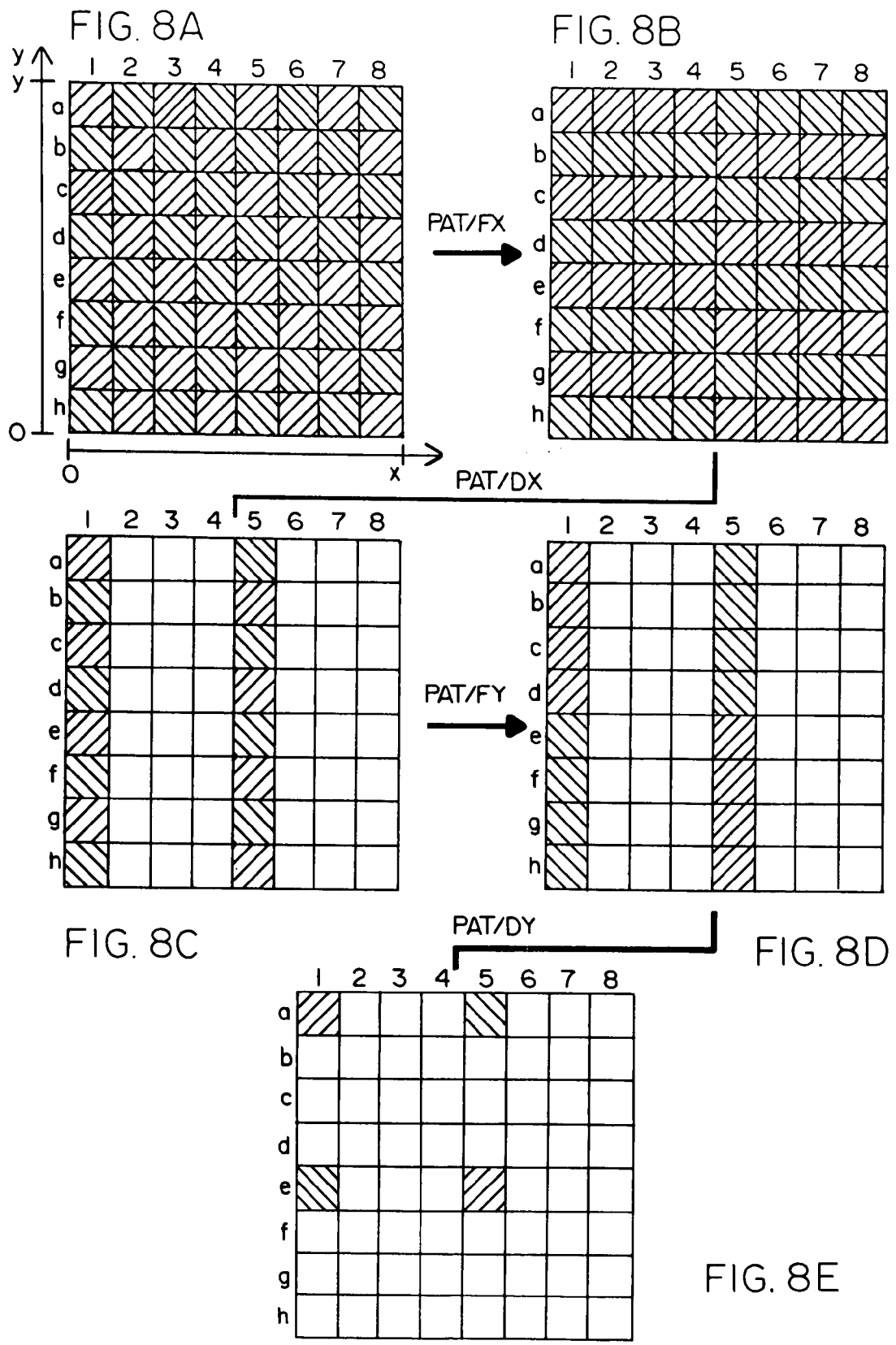

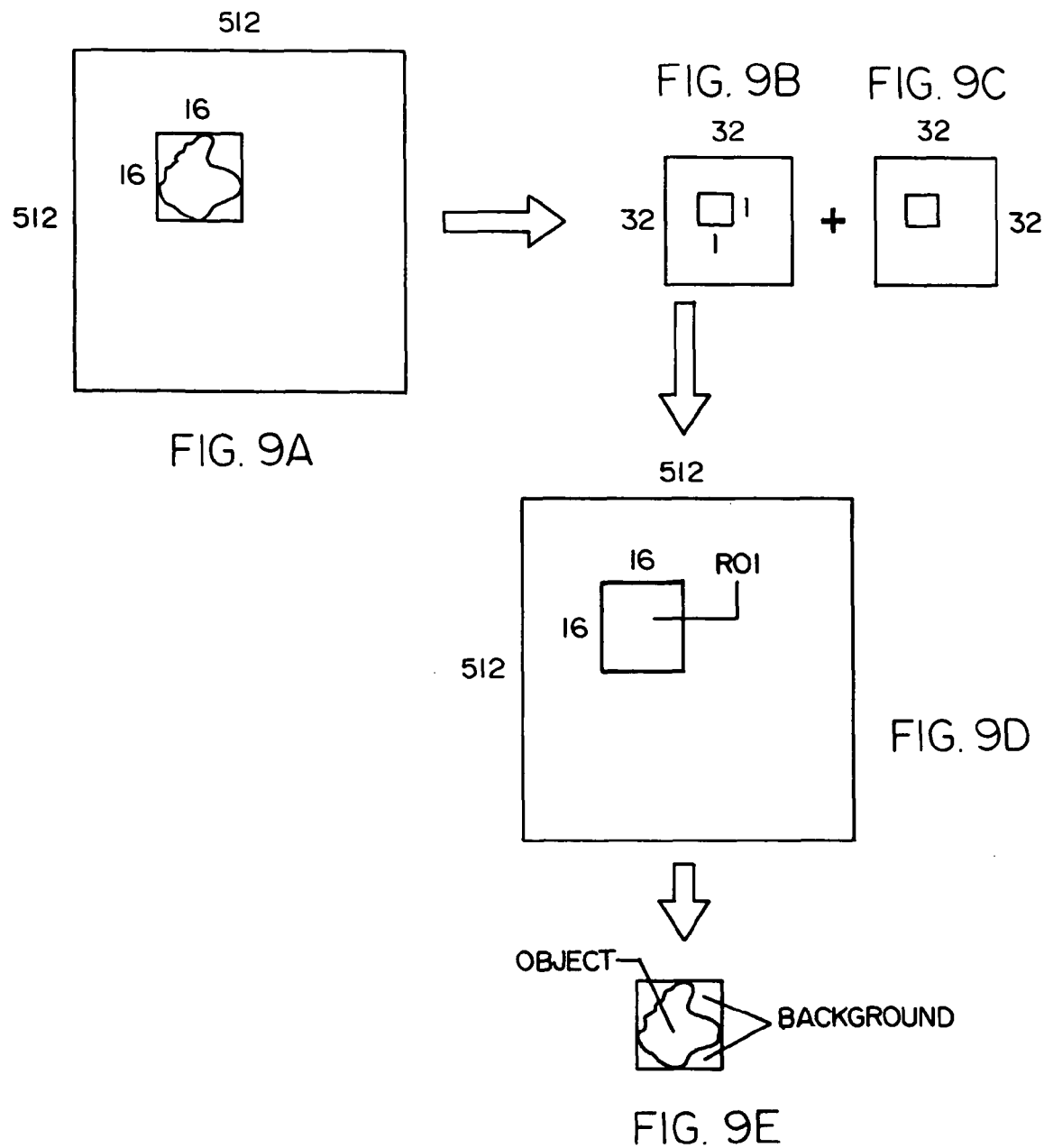

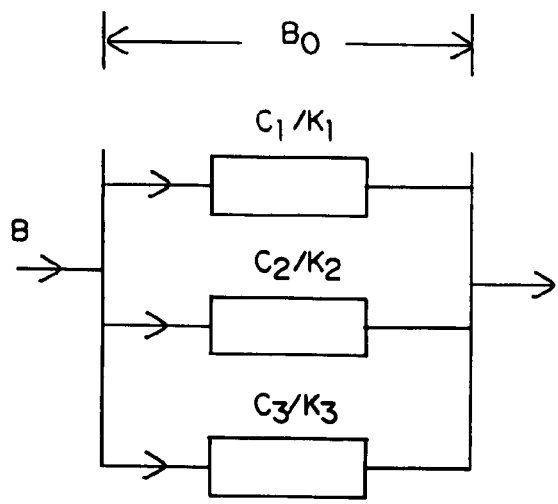
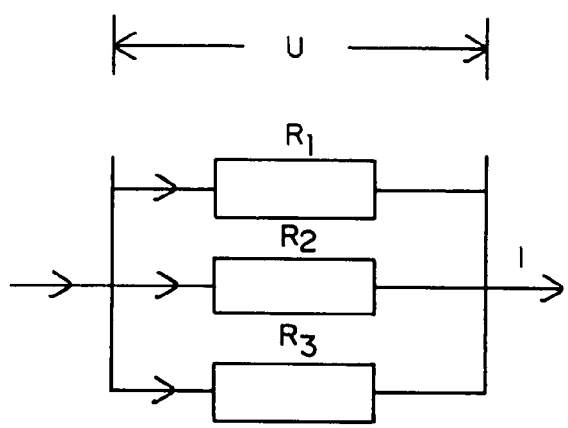
FIG. 19A
FIG. 19B
| | | | |
|---|---|---|---|
| 2 | 8 | 20 | 150 |
| 4 | 5 | 181 | 250 |
| 6 | 240 | 251 | 120 |
| 180 | 7 | 30 | 220 |
FIG. 20

APPARATUS AND METHOD EMPLOYING PRE-ATR-BASED REAL-TIME COMPRESSION AND VIDEO FRAME SEGMENTATION

ORIGIN OF THE INVENTION

The invention described herein was made in the performance of work under a Naval Air Systems Command contract No. N68335-02-C-3150, and is subject to the provisions of public law 96-517 (35 USC 202) in which the government has certain rights in the invention.

BACKGROUND OF THE INVENTION

1. Field of the Invention

The present invention relates to automatic target recognition, digital video processing (compression, frame segmentation, image segmentation, watermarking), sensor fusion and data reduction.

2. Background Discussion

ATR, also known as Automatic Target Recognition, or Target Identification (ID) is a well-established method of automatically recognizing and discriminating true targets from false targets. Targets can be military (tank, artillery gun, UAV (Unmanned Aerial Vehicle), UGV (Unmanned Ground Vehicle)), or civilian (human, animal, auto, et cetera). Targets of interest are usually mobile, or in motion. The basic problem of ATR is successful target acquisition, or identification of ROI, or Regions of Interest, or successful data reduction, called pre-ATR. Such pre-ATR should be provided in real-time, or in Ultra-Real-Time (URT), in order to make the ATR effective in real-world scenarios, both military and civilian. This is a natural objective if we consider biologically-inspired pre-ATR that is done on a millisecond (msec) scale. In typical video, which is 30 frames per second, with 30 msec-frame duration, effective pre-ATR should be done within a few milliseconds, or even in sub-milliseconds (URT). This is a formidable task, only rarely achievable, mostly in a research environment. This is a general problem of imagery or video sensors, including sensor fusion (see L. A. Klein, Sensor and Data Fusion, SPIE Press, 2004 and E. Waltz and J. Llinas, Multisensor Data Fusion, Artech House, 1990). Such sensors acquire a tremendous amount of information. For example, for a typical video frame of 740×480 pixels, 24 bits per RGB pixel, or 24 bpp, the video frame content is: 740×480×24-8.5 million bits per frame, and the original video bandwidth, for 30 fps, is 256 Mbps. Therefore, because of the large amount of information acquired by such sensors, any reasonable data reduction is a formidable task, especially if made in real time, or in Ultra-Real-Time (URT). In contrast, for the single pointing sensor such as acoustic range sensors, the data reduction is simple (T. Jannson, et al., "Mobile Acoustic Sensor System for Road-Edge Detection," SPIE Proc., vol. 6201-36, 2006), but the amount of information they acquire is very low. This problem is discussed, in detail, in T. Jannson and A. Kostrzewski, "Real-Time Pre-ATR Video Data Reduction in Wireless Networks," SPIE Proc., vol. 6234-22, 2006.

The literature on ATR is very comprehensive, and in the 1960s and 1970s focused mostly on coherent ATR, i.e., ATR based on objects illuminated by laser (coherent) light beams. Such ATR, based mostly on Fourier transform, and complex-wave-amplitudes (see, e.g., J. W. Goodman, Introduction to Fourier Optics, 2nd ed., McGraw-Hill, 1988), and recently on wavelet-transform (WT), has been successfully applied to SAR (Synthetic Aperture Radar) imaging, where optical hardware (lenses, holograms) have been replaced by electronic hardware. Such ATR has very limited applications to this invention, since TV or video cameras are mostly passive devices in that they use ambient (white) light rather than active light sources such as lasers (nevertheless, some cameras can use laser light).

Many digital video cameras use some kind of digital video processing, including various types of video compression (MPEG, wavelet), frame segmentation, novelty filtering, et cetera. The literature on video compression is very broad, including many patents, including Applicant's issued U.S. Pat. Nos. 6,137,912; 6,167,155; and 6,487,312, the content of which is hereby incorporated herein by reference. These techniques provide high quality video images at relatively low bandwidth, with Compression Ratios (Cs) approaching 4000:1. These are MPEG-based, with a new type of I-frames called M-frames, which are meaningful I-frames, to be introduced only, when motion error, in respect to a reference I-frame, exceeds a pre-defined threshold value (see "Soft Computing and Soft Communication (SC2) for Synchronized Data" by T. Jannson, D. H. Kim, A. A. Kostrzewski, and V. T. Tarnovskiy, Invited Paper, SPIE Proc., vol. 3812, pp. 55-67, 1999).

The difficulties of video data reduction, in general, and pre-ATR, in particular, are well described in "Real-Time Pre-ATR Video Data Reduction in Wireless Networks" by T. Jannson and A. Kostrzewski, SPIE Proc., vol. 6234-22, 2006, where the concept of M-frames is also described. An example of primitive pre-ATR is described in "Real-Time Pre-ATR Video Data Reduction in Wireless Networks" by T. Jannson and A. Kostrzewski, SPIE Proc., vol. 6234-22, 2006, where a method of moving object location by triangulation through a cooperative camera network, as well as object vector (value, and direction) evaluation, is used.

Prior-art computer vision object recognition and scene interpretation strategies are typically applied in two-steps: low-level (pre-ATR edge/boundary detection); and high-level (image segmentation). Natural terrestrial landscape, oblique aerial, UAV images, and others, typically consist of pattern combinations, some of them true targets, some of them false targets, with boundaries created by abrupt changes in feature signs such as specific motion, color, texture, and other signatures, greatly complicating automatic image processing, or ATR. A reliable algorithm needs to consider all types of image attributes to correctly segment real natural images. There is a larger literature of so-called image understanding Geometric Invariance in Computer Vision by Mundy et al, The MIT Press 1992 which considers image invariants and geometrical invariants in order to analyze mostly rigid bodies in motion, or their combinations, and formulates adequate mathematical framework, mostly in the form of so-called affine transforms, and covariance matrices, that analyzes mathematical relations between movement of a rigid body (3 rotations and 3 translations, or 6-degrees of freedom) and its projections obtained at the camera image plane (see Gerald Sommer, "Applications of Geometric Algebra in Robot Vision", Computer Algebra and Geometric Algebra with Applications, Volume 3519, 2005). This image understanding is then collapsed to algorithmic image segmentation. This, however, itself is an ill-posed problem. That is, it involves inferring causes (a large pool of events), or actual scenes from effects (a small pool of effects, or sensor readings), or detected images. This is generally called Bayesian inference and it is a natural cost of any sensor reading (human organism is such a large sensory system).

One recent solution to this sensory problem has been introduced, see "Edge Flow: A Framework of Boundary Detection and Image Segmentation" by W. Y. Ma and B. S. Manjunath, IEEE Computer Vision and Pattern Recognition, 1997, by using boundary detection and image segmentation called "edge flow". In their framework, a predictive coding model identifies and integrates the direction of change in image attributes (color, texture, and phase discontinuity) at each image location, and constructs an edge flow vector that points to the closest image boundary. By interactively propagating the edge flow, the boundaries where two opposite directions of flow meet in a stable state can be located. As a rule, additional expert information is needed to segment the objects or ROIs. Traditionally, in the literature (see, e.g. "A Computational Approach To Edge Detection" by Canny, J., IEEE Trans. Pattern Analysis and Machine Intelligence, 8:679-714, 1986), edges are located at the local maxima of the gradient in intensity/image feature space. In contrast, in "edge flow", as in "Edge Flow: A Framework of Boundary Detection and Image Segmentation" by W. Y. Ma and B. S. Manjunath, IEEE Computer Vision and Pattern Recognition, 1997, edges (or, image boundaries in a more general sense) are detected and localized indirectly. This is done by first identifying a flow direction at each pixel location (a gradient) that points to the closest boundary, and then detecting where edge flow in two opposite directions meet. This is a very effective method which gives excellent results provided there is sufficient time for computation. Unfortunately, typically such sufficient time is much too long to realize any real-time operation.

The same conclusion is true for other prior-art methods of spatial image segmentation, including recent efforts in video surveillance, used in Homeland Security applications.

Patent prior art deemed to be relevant to the present invention includes U.S. Pat. Nos. 7,010,164; 7,088,845; 6,404,920; 5,768,413; 6,687,405; 6,973,213; 5,710,829 and 5,631,975 which all relate to image segmentation; U.S. Pat. Nos. 5,654,771 and 6,983,018 which relate to motion vector image processing; U.S. Pat. No. 6,453,074 which deals with image decimation and filtering (although not in real time and for still images, not video images); U.S. Pat. No. 5,970,173 which relates to affine transformation for image motion between frames; U.S. Pat. No. 6,285,794 which treats compression by morphing; U.S. Pat. No. 6,628,716 which treats wavelet-based video compression; and U.S. Pat. No. 7,027,719 which discloses a catastrophic event recorder including video data compression.

SUMMARY OF THE INVENTION

One of the most effective known methods of data reduction for imaging or video sensing is defining a Region of Interest, or ROI, and its separation from background, or clutter. In digital video literature, the ROI method is equivalent to so-called Frame segmentation (see "Video Frame Segmentation Using Competitive Contours" by Piotr step'c, Marek Doma'nski, Eusipco 2005). One subject of this invention is the development of a novel ROI method, or Frame Segmentation Method that can be provided within a video stream, in real-time, or more precisely within a few milliseconds of video frame duration of 30 msec, or even in the sub-millisecond range. This video frame segmentation is the basis of Pre-ATR-based Ultra-Real-Time (PATURT) video compression. Another subject of this invention is a novel PATURT-based ATR method. (The PATURT acronym is used to emphasize the basic kernel of the invention, which is Ultra-Real-Time pre-ATR). Still other subjects of this invention are morphing compression, and watermarking, also based on the PATURT. All of these novel methods, systems, and/or devices employ both software and hardware. They apply standard tools such as MPEG-1, MPEG-2, MPEG-4, MPEG-7, and wavelet compression, as well as wavelet transform (WT), in a unique way that is also a subject of this invention. This unique application is derived from the PATURT, as illustrated in FIG. 1, where other applications are also shown.

In FIG. 1, the general schematic of the invention is presented. It is focused on the PATURT, which is the kernel engine of the invention. The PATURT applies well-known tools such as MPEG-1, MPEG-2, and MPEG-4 compression standards, and MPEG-7 standard, recently developed (see "Introduction to MPEG-7" by B. S. Manjunath, P. Salembier and T. Sikura, (eds.), Wiley, 2002), as well as wavelet compression, and a general watermarking concept. It also applies Wavelet Transform (WT), recently developed in the form of the WT chip (see Analog Devices vide codec chips including ADV202, ADV601, ADV611/612' http://www.analog.com/en/cat/0,2878,765,00.html). The PATURT kernel (engine) general innovation has consequences in a number of specific innovations, such as PATURT compression, and PATURT-ATR. The new type of watermarking, called PATURT-watermarking, is also subject of this invention. The particular execution of the MPEG-7 standard, called PATURT MPEG-7, is also a subject of this invention. The morphing compression is a part of the PATURT compression, but it will be discussed separately as a very special compression method that leads to very high Compression Ratio (CR), approaching 100,000:1.

The applications of the PATURT innovation includes a novel type of ROI-based real-time video recording that has special applications for aircraft pilot/cockpit video recording in "black-box" devices, recording aircraft accidents, or catastrophes. Such black-box devices usually need to pass high impact (3400 g), high temperature (1100° C., in 1 h), and other harsh environmental tests. In this invention, they also have the capability of reporting the last cockpit events up to 0.5 seconds before an accident, including all cockpit sensor readings, as well as pilots' behavior, the latter with fully scrambled and non-recoverable facial information.

A medical application relates to medical imagery which is compressed in such a way that the compression is virtually loss-less, or human perception lossless; i.e., it preserves all medical imagery patient's records, at the level of digital medical imagery, or even higher.

The PATURT authentication (ID) application is based on PATURT watermarking in such a way that some low-importance bits are altered at the clutter, or background region, while leaving the ROI intact. This includes PATURT security applications, which are based on PATURT watermarking in such a way that some low-importance bits are altered outside the ROI within inter-frame video streams for security purposes. They can have, for example, the instructions to increase Bit-Error-Rate (BER), or scramble data content (by increasing CR ratio to very high values, for example), when the video frames have been tampered with, or video theft has been carried out. This also includes the PATURT watermarking instructions application, where the watermarking has virus instructions to destroy video content, if a video theft occurred.

Further applications include video surveillance. The latter can be also applied to missile defense (recognizing real target or real missile, from false targets (decoys)), or to other Ultra-Real-Time (URT) civilian and military scenarios.

All of these watermarking applications have one thing in common, namely, bit altering is done outside the ROI region, and all these operations are done within a few milliseconds or faster; thus preventing any effective countermeasures.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIGS. 8A through 8E show typical PATURT filtering and decimation;

FIGS. 9A through 9E show the effect of PATURT filtering and decimation on a typical ROI;

FIG. 19 comprising 19A and 19B is a drawing showing an electrical analogy between (a) multimedia data-transmission and (b) current branching through parallel resistors;

FIG. 20 is a 4×4 table of 8-bit digits representing an example of two-dimensional digital mapping of sensor data;

DETAILED DESCRIPTION OF THE PREFERRED EMBODIMENTS OF THE INVENTION

Pre-ATR-based Ultra-real-time (PATURT) video from segmentation is a type of image segmentation that is both spatial and temporal in nature; i.e., it applies both spatial and temporal signatures. The most important temporal signatures are various object motion signatures, characterized by a limit of speed of an object, typically represented either by a combination of rigid bodies or by one rigid body, a car, for example. The most important spatial signatures are: color (RGB), texture, size, aspect ratio, or a combination of these. More sophisticated spatial signatures are 2D projections of 3D contours, fiducial-point mappings, et cetera.

All these signatures can be considered within the PATURT scheme. The PATURT scheme will take form as a method, device, and/or system in the body of a PATURT kernel.

PATURT Kernel

The PATURT kernel is a compound feature, constituting a unique combination of elementary features that are applied in proper sequence. The specific features, or sequential steps, include: (1) selection of the principal signatures and secondary signatures; (2) selection and extraction of the ROI contour (boundary); (3) applying multifacet inhomogeneous compression (MIC); and (4) applying ATR, as an alternative option.

Selection of Principal Signature (Step 1)

Figure 2:
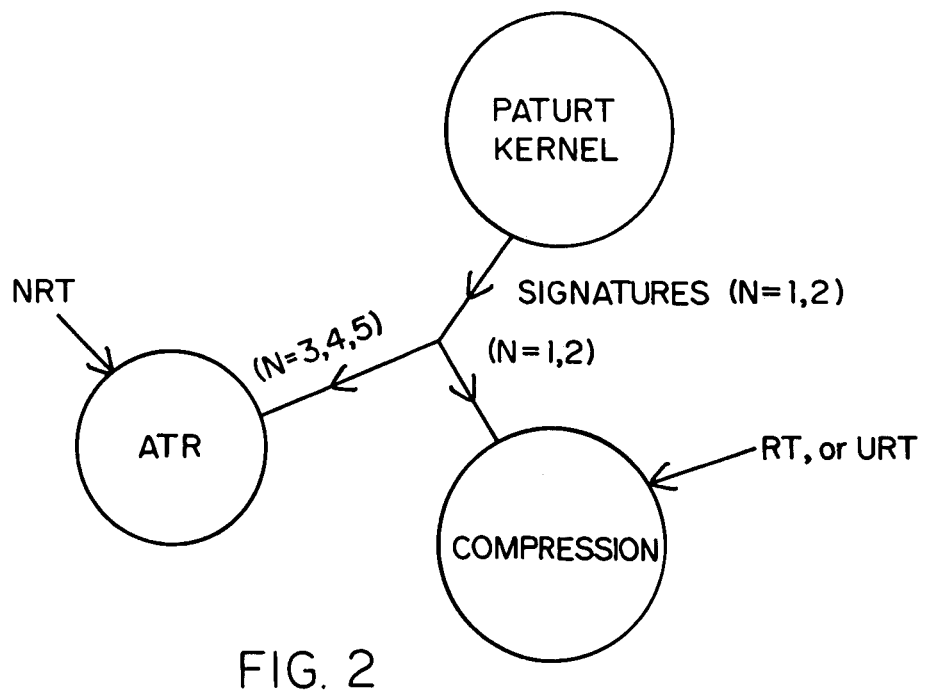
FIG. 2 is a drawing depicting alternate paths of the PATURT kernel of FIG. 1.

Signatures are selected in sequence: $1^{st}$ principal, $2^{nd}$ principal, et cetera. The number of selected signatures, N, depends on the time available for computation and the bandwidth available for data transfer. This also depends on the path we take: multifaceted inhomogeneous compression (MIC), or ATR, as shown in FIG. 2.

Figure 3:
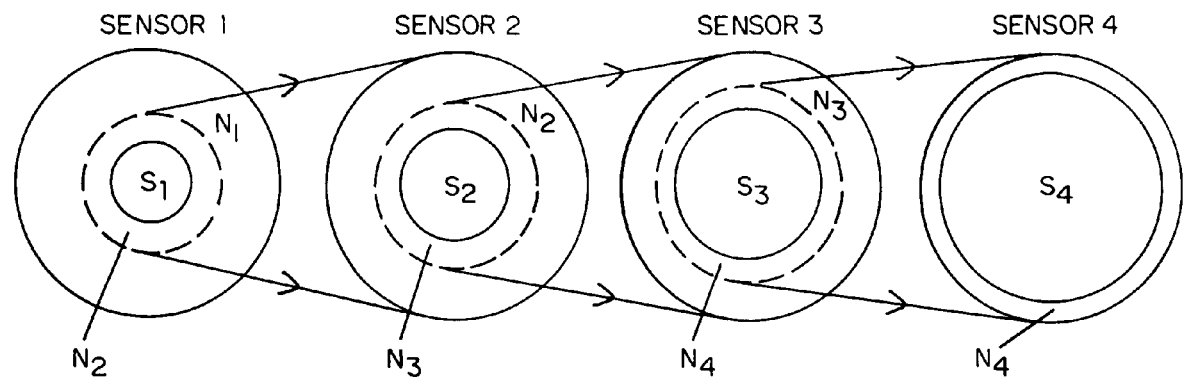
FIG. 3 is a conceptual illustration of sequential sensor fusion based on the principle of effective false target rejection.

The selection of signatures is based on an effective false target rejection (FTR) principle, which is characterized by an analog of a sequential sensor fusion process, characterized by high false positive rate (FPR), also called FAR (false alarm rate), and low false negative rate (FNR). These signatures can be described by conditional probabilities, both direct and inverse, the latter, Bayesian, are described in "Bayesian Inference and Conditional Possibilities as Performance Metrics for Homeland Security Sensors" by T. Jannson, SPIE Proc., pp. 6538-39, 2007. The related sensor fusion process is illustrated in FIG. 3, where $S_1$, $S_2$, $S_3$, $S_4$ and signals (S), are true targets, while $N_1$, $N_2$, $N_3$, $N_4$ are related noises (N), or false targets. The FTR principle is such that the SNR (signal-to-noise ratio) increases with increasing numbers of steps ("sensors"), due to constant rejection of false targets, while leaving signals (true targets) in the pool. The analogous situation takes place when we would like a terrorist search to reject evident nonterrorists (false targets) from a large pool of people (~1,000).

The false target rejection (FTR) principle is as follows. The 1st sensor rejects many false targets, equal to ($N_1$-$N_2$), where $N_1$ is the total number of false targets, and $N_2$ is the number of false targets that remain in the pool. Since false negative rate (FNR) is very low, we can assume that almost all true targets ($S_1$=$S_2$=$S_3$=$S_4$=S) remain in the pool. Then Sensor 2 repeats the process, where only $N_3$-false targets remain in the pool. The ratio of false targets that remain, not rejected by the $1^{st}$ sensor, is ($N_2/N_1$), and by the 2nd sensor, ($N_3/N_2$), et cetera. The overall ratio of sensor fusion is $$\frac{N_4}{N_1} = \frac{N_4}{N_3} \frac{N_3}{N_2} \frac{N_2}{N_1} \qquad (1)$$

and the overall SNR is $$(SNR) = \frac{S}{N_4} = \frac{S}{N_1}\frac{N_1}{N_4} = (SNR)_1 \frac{N_1}{N_4} \quad (2)$$

i.e., the SNR of the (sensor fusion) system has been increased by a factor of $N_1/N_4$. For example, for $$\frac{N_4}{N_3} = \frac{N_3}{N_2} = \frac{N_2}{N_1} = 10^{-2} \quad (3)$$

the $(N_4/N_1)$ value is $10^{-6}$, and $(N_1/N_4)=10^6$; i.e., the SNR has been increased 1,000,000 times (in fact, the system is comprised of three (3), not four (4) acting sensors, since Sensor 4 is not acting, only receiving).

The FTR principle is applied in the PATURT kernel, where "sensors" are replaced by "software agents" performing the operation of applying specific signatures for image segmentation. Therefore, the 1st sensor is represented by the 1st software agent, applying the 1st principal signature, et cetera. This analogy between sensor fusion and component feature-based software agents constituting the PATURT kernel, is a subject of this invention.

Speed Vector Flow as a Temporal Principal Signature

Figure 4:
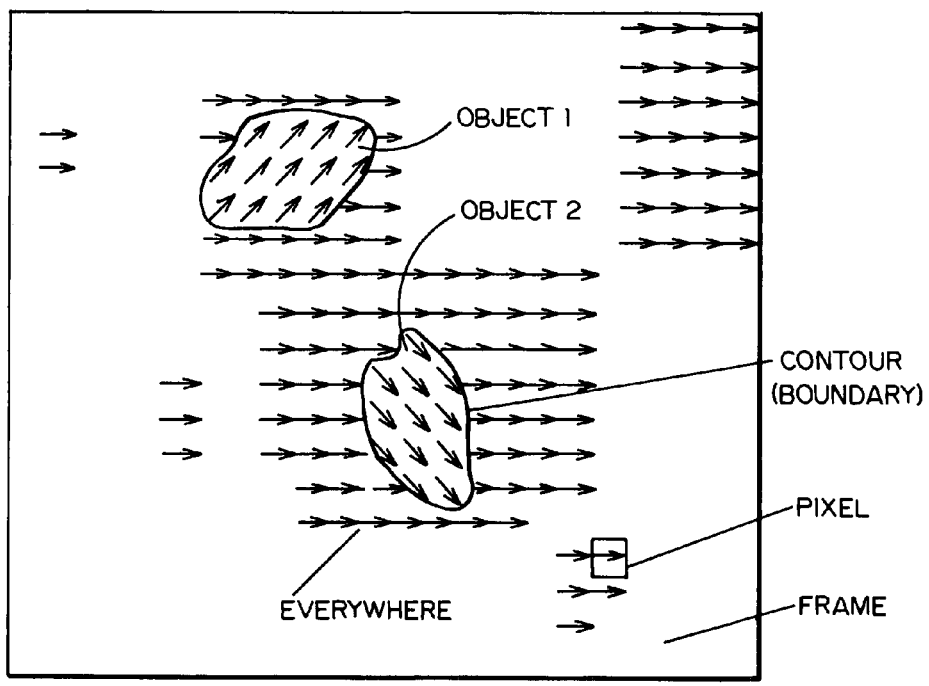
FIG. 4 is a simplified illustration of speed vector flow for an exemplary video frame.

The speed vector flow (SVF), or for short, vector flow, is a well-known scheme in digital video processing (see; for example "Gradient Vector Flow Deformable Models" by C. Xu and J. L. Prince, Handbook of Medical Imaging, edited by Isaac Bankman, Academic Press, September, 2000). By comparing the segment video frames, pixel-by-pixel, we can develop the mapping of the SVF in the form of pixel vectors, characterizing motion within the frame. A number (not substantially exceeding 10) of moving objects can be considered, including the camera. The SVF pixel vectors can be represented either mathematically by two (even) numbers, or graphically by speed vectors (vehicle or module; and direction). In the first case, numbers are crisp values representing crisp vector (x,y)-coordinates, such as (1, 2), or (2, −6). In the second, they are directed arrows. Such arrows, normalized to constant value for simplicity, are shown in FIG. 4, where an example video frame is presented. Two moving objects are shown, moving in different directions. The remaining pixel vectors represent horizontal movement of the camera from left to right.

Pixel-by-Pixel Subtraction

The basic mathematical operation for PATURT kernel signatures, both spatial and temporal, is pixel intensity subtraction (PIS) which is preferable for high computing speed and capability of using low-cost parallel computing, a subject of this invention for the PATURT kernel purposes (application). This operation computes Eucledean (or, other) distance between two pixels, pixel clusters, or templates, each template comprising pixel intensities (or, other sensor values), in the form of 2D (or, 3D, or higher dimension) mapping. Such template mapping can be composed of sensor template values, or pattern abstractive values (which can represent some general activity, or image, or pattern). They can also be altered by some expert instruction, in the form of so-called logic templates, such as those discussed in "Sensor and Data Fusion", SPIE Press, 2004 by L. A. Klein. The comparison between two templates for defining Eucledean distance (or, other distance) can be also very general, defined by pixel-to-pixel comparison, such as the same pixel for two different frames, or two sequential (or, defined by some specific relation, such as each $2^{nd}$ pixel, or each modulo pixel, et cetera) pixels for either the same frame, or two segment frames, et cetera. There are many definitions of distance: Eucledean is only one of them; others are defined, for example, in "Sensor and Data Fusion", SPIE Press, 2004 by L. A. Klein. Also, comparison can be between whole frames, or between specific moving objects, or between frame blocks, et cetera. The pixel-to-pixel intensity subtraction (PIS) comparison can be between pixel intensifies, as pixel-to-pixel, frame-to-frame, object-to-object, frame-to-reference frame, object-to-reference object, intensity-to-threshold value ROI-to-ROI et cetera. The Eucledean distance, also called Mean Square Error (MSE), as in "Digital Image Processing" ($2^{nd}$ Edition), 2002 by R. C. Gonzales and R. E. Woods, is well known quantity:

$$(MSE) = \sum_{i=1}^{n}\sum_{j=1}^{m}(f_{i,j} - F_{i,j})^2 \quad (4)$$

where i,j—are pixel numbers, n,m—are pixel numbers for ROI, $f_{i,j}$—are pixel intensities for so-called sample ROI, while $F_{i,j}$—are pixel intensities for reference ROI. The terms "sample" and "reference" depend on context. Also the term "pixel intensities," can be replaced by other, more abstract terms, as discussed above. For the specific case of video imaging quality, another parameter is also used, namely, peak-signal-to-noise ratio, or (PSNR), which is in decibels (dB), in the form:

$$(PSNR)[dB] = 10\log_{10}\frac{\text{constant}}{\sqrt{MSE}} \quad (5)$$

where the constant-value depends on definition (such as CL-number of gray levels, which is typically 256, or 8 bits per pixel, per color, or 8 bpp in the RGB video case).

Color Mapping as a Principal Spatial Signature

In the case of color signature; or more general, spectral signature, we apply the generalization of standard RGB (Red-Green-Blue) scheme, represented in VGA video by 24 bpp, 8 bpp per each color. The RGB scheme can be generalized into similar multi-color schemes applied for IR (infrared) multi-spectral and hyper-spectral sensors. In such a case, instead of comparison of sample wavelength spectra with reference wavelength spectra, we compare the generalized RGB "color" components, which are defined in such a way that they accurately describe the sample spectra of interest (SOI). (The SOI acronym is an analogy to ROI). Then, the pixel-to-pixel intensity subtraction (PIS), in the form of Eucledean distance, as in Equation 4, can be applied to color matching operation (CMO), in the form of 3D pixel vectors, similar to speed pixel vectors, as in Vector flow analysis, discussed above. In such a case, we apply Equation 4 to pixel-to-pixel subtraction. The color intensity ratio defines the vector direction, while the overall "white" intensity defines the vector module, or value. Then, the CMO is formalized by color unit Vector (CUV) subtraction.

Let us consider RGB intensity pixel vector, $\vec{I}_{ij}$ ($R_{ij}$, $G_{ij}$, $B_{ij}$), where $R_{ij}$, $G_{ij}$, $B_{ij}$ are red, green, and blue, RGB color vector components, in the form:

$$R_{ij}^2 + G_{ij}^2 + B_{ij}^2 = I_{ij}^2 \quad (6)$$

where $R_{ij}$ is ij-th pixel intensity for red color RGB component, same for green and blue, and $$|I_{ij}| = \sqrt{R_{ij}^2 + G_{ij}^2 + B_{ij}^2} \quad (7)$$

is overall intensity vector module. Thus, the CUV is, $$\vec{U}_{ij} = \frac{\vec{I}_{ij}}{|I_{ij}|} = \frac{(R_{ij}, G_{ij}, B_{ij})}{\sqrt{R_{ij}^2 + G_{ij}^2 + B_{ij}^2}} \qquad (8)$$

and $$|\vec{U}_{ij}| = 1.$$

Figure 5:
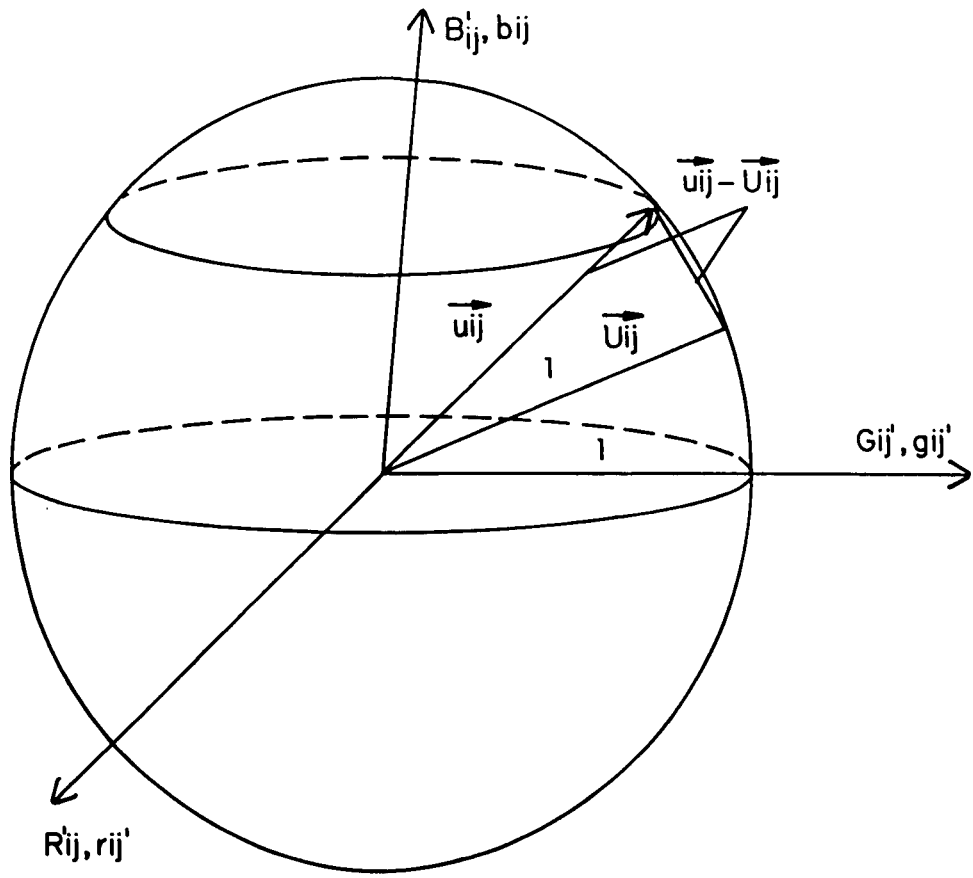
FIG. 5 is an illustration of two-color unit vector subtraction.

The CUV subtraction is illustrated in FIG. 5, where $\vec{u}_{ij}$ is sample CUV, while $\vec{U}_{ij}$ is reference CUV. This subtraction is in the form:

$$|\vec{u}_{ij} - \vec{U}_{ij}| = |\sqrt{(r'_{ij} - R'_{ij})^2 + (g'_{ij} - G'_{ij})^2 + (b'_{ij} - B'_{ij})^2} \qquad (9)$$

where small u, r, g, b-letters denote the sample unit vector $\vec{u}_{ij}$, while capital U, R, G, B-letters denote the reference unit vector $\vec{U}_{ij}$ (primes denote unit vector components). This equation is analogous to Equation 4 for single pixel, but for RGB colors.

The above pixel-by-pixel vector subtraction operation can be computation time and bandwidth-consuming; thus, it is more useful for the ATR path, as in FIG. 2. In such a case, we select those pixels, for which the CUV-subtraction value is below some threshold value, in the form:

$$|\vec{U}_{ij} - \vec{u}_{ij}| \le T \qquad (10)$$

where T is predefined threshold value. The Spectral Region of Interest (SOI) is defined by those pixel clusters, which predominantly have CUV-subtraction values below threshold value T.

In the case when the color signature has a dominant color component, "red" color, for example, we can simplify the above operation by applying principle of "bright points," or bright pixels. In such a case, instead of Equation 10, we can use the following relation:

$$R_{ij} > T_B \qquad (11)$$

where $R_{ij}$ is absolute color intensity vector $\vec{I}_{ij}$-component, and the same for green and blue. Then, only "red-bright" pixels will be selected, that have value higher than predetermined threshold value, $T_B$. In such a case, $T_B$-value must be normalized to average color value in order to eliminate illumination background. This is also a subject of this invention.

Selection and Extraction of ROI Contour or Boundary (Step 2)

Prior art methods of the ROI contour/boundary extraction are very time consuming; thus, they are not suitable for real-time operation, especially for ultra-real time (URT) operation. In contrast, the PATURT kernel is optimized for real-time (RT) and the URT operation. Its computing time is only a fraction of the video frame time, which is 30 msec for typical real-time video processing and even sub-millisecond for the URT. Thus, the contour-extraction PATURT operation should be a few milliseconds for the RT, and fractions of milliseconds for the URT. It is based on filtering, decimation, and pixel-by-pixel subtraction, but the first two operations (filtering and decimation) must be such that the 3rd operation (pixel intensity subtraction) will take a minimum time of operation. The edge/contour extraction of the PATURT kernel can be better explained by using phase-space formalism, called phase-space-scaling (PSS), which is suitable for the RT and URT purposes.

The PSS operation is based on the phase-space concept, well-known in quantum physics, adopted here for the PATURT kernel purposes. In our case, the phase-space is four-dimensional (4D) space (x,y; $f_x$, $f_y$), where (x,y)—are video frame Cartezian coordinates, and ($f_x$, $f_y$) are (x,y)—components of local spatial frequency vector, $\vec{f}$, in the form:

$$\vec{f} = (f_x, f_y) \text{ and } f_x^2 + f_y^2 = f^2 \qquad (12)$$

The local spatial frequency (LSF) vector, $\vec{f}$, is 2D-vector is described in "Introduction to Fourier Optics" by J. W. Goodman, 2nd ed., McGraw-Hill, 1988. It characterizes resolution details of the frame spatial pattern, in the form:

$$f = |\vec{f}| = \frac{1}{T_s} \qquad (13)$$

where $T_s$ is resolving element, or characteristic size of resolution detail. For example, for $T_s$=0.1 mm, f=10 mm, and for $T_s$=10 μm, f=100 mm.

The phase-space-scaling (PSS) operation scales the frame phase space domain into smaller size, in order to save transmission bandwidth and shorten computation time. In many practical cases, the object scale (ratio of object size to frame size) is known in advance. For example, in the aircraft black box case, the practical scene is the cockpit with known pilot and cockpit size. However, even if the object scale is not known in advance, we can apply adaptive procedures by starting with middle scale and recursively refining the estimation in the subsequent frames. For example, when an object appears in the video, we use scale 2 for the PSS operation. At the end of PATURT ROI extraction operation, the object size is calculated and used to determine the scale number for PSS operation in the next frame. The process is repeated as long as the object is in the video.

The procedures are similar to that for spatial signature, except instead of relying on two subsequent frames with pixel-by-pixel subtraction, we rely on the same frame and frame shifted by a small number of pixels. As an example, consider a simple object such as a shirt with spatial frequency of 5 lines/cm. This is twice smaller when maximum frequency f0 comes from Nyquist resolution criterion for 640×480 pixel resolution and object scale 1×1. When the screen size is 320×240 mm, the Nyquist resolution is defined as 1 mm. Now the distance between pixels is 0.5 mm. This is why in addition to a low pass filter, we need to apply a high pass and a band pass filter, which are applied in a way similar to the low pass filter.

Figure 6:
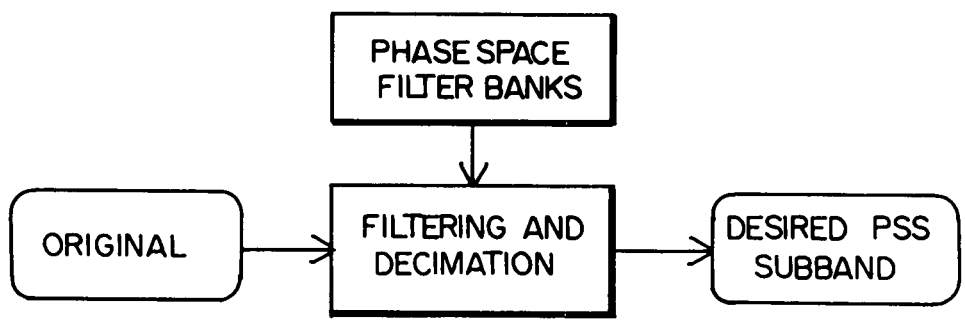
FIG. 6 is an illustration of operation flow of PATURT phase space scaling.
Figure 7:
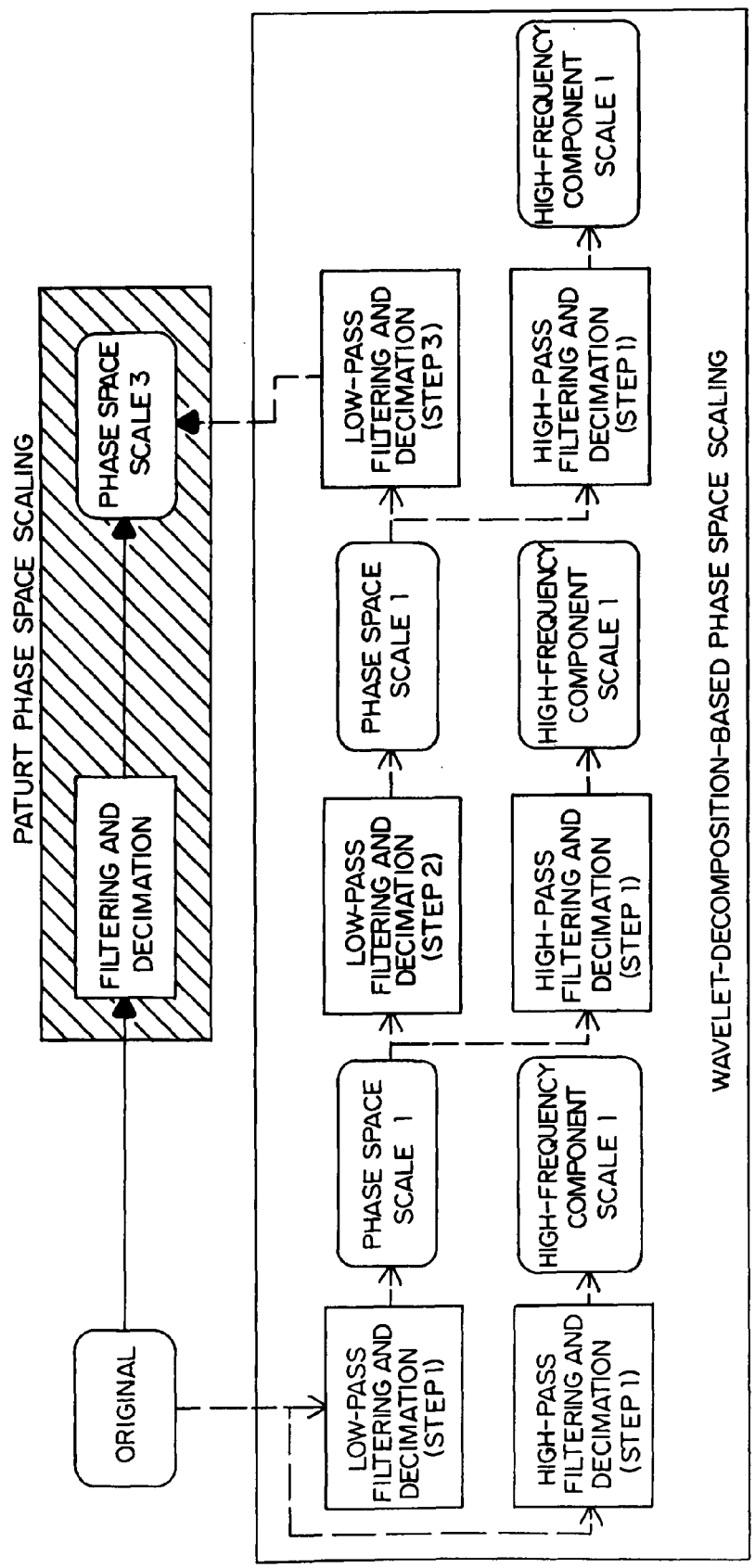
FIG. 7 is a block diagram comparison of PATURT Phase Space Scaling and Wavelet Decomposition based PSS operation.

For real-time (RT), or ultra-real-time (URT), application purposes, the PATURT phase space scaling operation is specially designed to compute the desired phase scale with minimal memory usage and computational complexity while achieving the same phase space scaling results as standard wavelet decomposition. In many practical cases, the on-screen size of an object changes constantly when its distance to the camera changes. In order to maximize the bandwidth reduction and system robustness, the optimal phase space scale should change dynamically based on the object on-screen size. For example, when an object appears small, the phase space scale should be low such that the details will be preserved as much as possible. When an object appears big, the phase space scale should be high to maximally reduce the redundancies in the object details. In order to achieve this, the calculation of desired phase space scale should be performed as fast as possible. The traditional phase space scaling operation based on standard wavelet decomposition implemented on WT chips (see Analog Devices vide codec chips including ADV202, ADV601, ADV611/612' http://www.analog.com/en/cat/0,2878,765,00.html) needs multiple cycles of filtering and decimation operations to calculate the optimal phase scale for given object size. In addition, other sub-bands outside of interesting phase space scales are also calculated and preserved during the process. This is a waste of both memory and computation resources. In contrast, the PATURT PSS operation completes the calculation of desired phase scale sub-band in one cycle of filtering and decimation using phase space filter banks (FIG. 6). The PATURT phase space filter banks consist of a series of integrated wavelet filters each with different phase space scale response. The comparison of these two PSS operations is shown in FIG. 7, using the calculation of phase space scale 3, which has $1/(2^3)=1/8$ of original size, as an example. The wavelet-decomposition-based PSS operation uses three cycles of filtering and decimation steps to derive the desired phase space scale, while PATURT PSS operation uses only one filtering and decimation step to derive the same result. Since PATURT PSS operation does not need to compute and save all intermediate results, it is more memory and computationally efficient than traditional wavelet-decomposition-based phase space scaling operation.

The PATURT PSS kernel operation has two necessary elements, namely PATURT filtering and PATURT decimation.

The PATURT filtering cuts the LSF vector Cartezian component $(f_x, f_y)$ domain by a factor of m; e.g., $f_x$—component domain, $f_o$, by factor of two (then, m=2), into $f_o/2$. Then, each second pixel, in x-direction, becomes partially redundant. Therefore, it can be eliminated (decimated) without too much loss of information. This is the operation of the PATURT decimation. This process is shown in FIG. 8, where, for illustration, an 8×8 pixel frame (block) was used (FIG. 8A; then, $x_o=y_o=8$. In FIG. 8A, the "chase" pixel coordinates have been applied, such as: a1, g5, et cetera. By different diagonality of pixel crossing (either north-east, or north-west) we emphasize that each pixel crossing has independent information. If, after filtering, two sequential pixels have dependent information, we emphasize this by the same diagonality (the absolute diagonality for any specific pixel, does not have any meaning, only relative diagonality between two pixels, does).

In FIG. 8A, all pixel intensities have independent values; so, their diagonalities are mutually orthogonal. The operation of the PATURT filtering, or PAT/F, is illustrated by transformation from FIG. 8A to FIG. 8B; since, it is in x-direction, we call this PAT/FX. It is shown by the same diagonalities of two separate pixels, in x-direction, such as a1 and a2, for example. The operation of the PATURT decimation, or PAT/D, is illustrated by transformation from FIG. 8B to FIG. 8C; since, it is in x-direction, we call this PAT/DX. Then, the filtering in y-direction, or PAT/FY, is shown between FIG. 8C and FIG. 8D; and y-direction, in FIG. 8E. As a result, a number of pixels, have been reduced from 8×8 to 2×2. The equivalent operation in phase-space is $f_o \rightarrow f_o/4$ for both $f_x$ and $f_y$, and: $x_o \rightarrow x_o/2, y_o \rightarrow y_o/4$.

There is a (32×32) number of such blocks, as shown in FIG. 9B, and complementary situation is shown in FIG. 9C. Then, the region of interest (ROI) is shown in FIG. 9D. This ROI is partially object, and partially background, as shown in FIG. 9E, which is an uncertainty introduced by the PAT/FD (filtering/decimation) operation.

Figure 10:
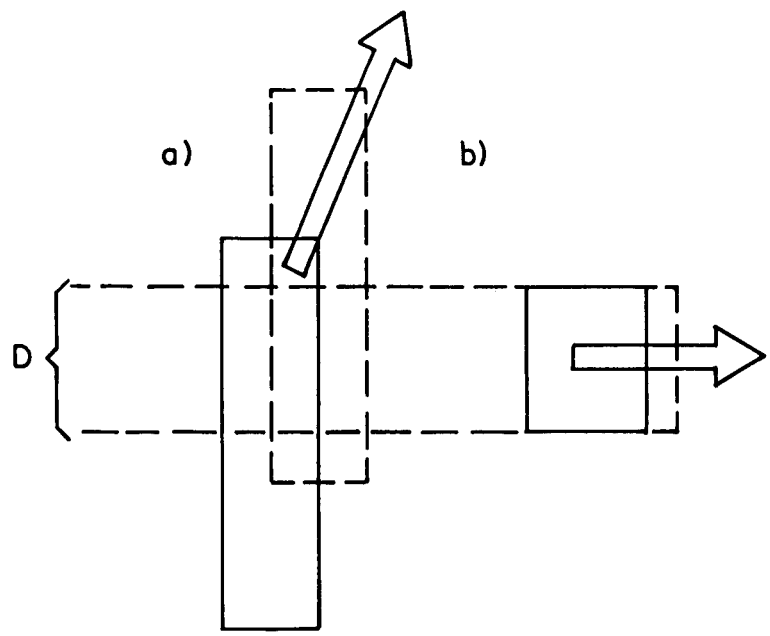
FIG. 10 illustrates a novelty filtering operation.
Figures 11A, 11B, 11C:
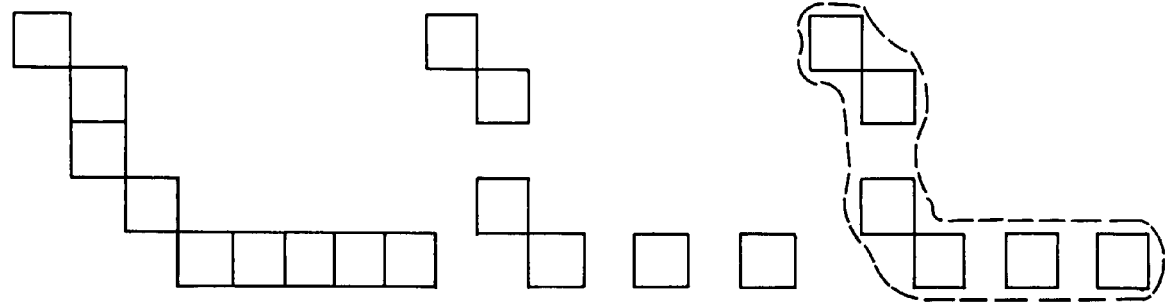
FIG. 11, comprising 11A, 11B and 11C, is an illustration of Edge Evolution using pixel decimation.

The $3^{rd}$ element of the PSS is the novelty filtering (NF) which is made with a reduced number of pixels, due to the PAT/FD, by comparison of two sequential video time-frames, both PSS-scaled. The PAT/NF, or PATURT novelty-filtering operation, is pixel-by-pixel subtraction (for the same-indexed ((i,j)-pixels), with reduced pixel-blocks by the PAT/FD. It is shown in FIG. 10, where the crossed areas are novelty areas for the object diagonal movement, as in FIG. 10A. As a result, within D-area, the significant novelty (large pixel-intensity-difference) will be observed in the correct areas as in FIG. 10B. These areas can be defined as object "edges", or ROI contours, allowing us to generally define all objects, or ROIs within the frame. Since, the PAT/FD/NF-operation is performed with a significantly reduced number of pixels, it can be done in the real time or even in the ultra-real time. However, the "cost" of this operation is some uncertainty of the object/ROI edge/contour, illustrated in FIG. 11, for this original size of the video frame. As a result, any image line (such as contour of ROI) is first filtered/decimated (FIG. 11B, and then smoothed, as shown in FIG. 11C.

The ROI edge extraction, discussed above, is based on ROI definition by the principal signatures, both temporal and spatial, the latter procedure, described in STEP 1. Both STEPS 1 and 2, as pre-ATR compound method, device, and system, are a feature of the invention. In particular, first, in STEP 1, the ROI is defined, and second, in STEP 2, the ROI edge is defined. For the ROI edge definition, we do not need to recognize the object, but only its low-resolution edge estimation. This is an essential feature of this invention, because only low-resolution estimation can be done in the RT, such as only a small fraction (few milliseconds) of the frame duration (30 msec).

The PSS can be also applied in order to define the ROI and its edge by texture principal signature, as an example of spatial principal signature. In such a case, the texture can be designed, for example, as high LSF vector component, both $f_x$ and $f_y$, which is defined by the LSF-domain of: $f_o/2 \leq f_x \leq f_o$, and $f_o/2 \leq f_y \leq f_o$, respectively. So, the PAT/FD can be defined for the above high frequency domain, and the PAT/NF can be performed for the same video frame (not, for sequential frames), by using the sequential pixels, instead of the same-indexed pixels as in the case of temporal signature discussed above. Such procedure can be generalized to any phase-space region: $(x,y: f_x,f_y)$, depending on definition of specific texture, or color signature. Therefore, the procedure from STEP 2 can be applied to STEP 1, helping to define the ROI, or vice versa. Both color and texture signatures, as well as visible RGB signature, and infrared "RGB" signatures (by using analogous to RGB procedure in infrared) can be applied in many variations for STEP 1, helping to define the ROI. For example, the color signature can be applied as the first principal signature, and the texture signature as the second principal signature, or vice versa. Such STEP 1 compound procedure is useful in order to distinguish between true and false targets.

The other spatial signatures, shape, size, and form factor, can be applied only after STEP 2, when the ROI edge has already been defined. For such a case, the ROI center of gravity is defined, as a first procedure. Then, the maximum average distance, and minimum average distance between the center and the edge are formed. From this information, both size and form factor are computed. In the case of shape, or profile of the ROI (object) edge signatures, the polar coordinate system is introduced, and profile polar distribution (PPD) is computed, and then compared to reference polar distribution by applying the polar compliance parameter (PCP), in the form $$PCP = 1 - L; \quad 0 \le L \le 1, \quad \text{where} \tag{14}$$

$$L = \sqrt{\frac{\int_0^{2\pi} |P(\phi) - P_o(\phi)|^2 \, d\phi}{\int_0^{2\pi} P_o^2(\phi) \, d\phi}}$$

where $P(\phi)$ is sample polar distribution, and $P_O(\phi)$ is reference polar distribution. For perfect compliance, L=0, and (PCP)=1. The PCP parameter is in %.

Figure 12A:
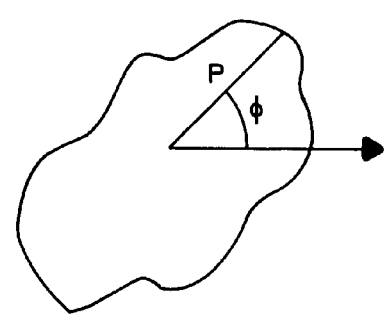
FIG. 12, comprising 12A and 12B, is an illustration of a Polar Contour Compliance (PCC) procedure.
Figure 12B:
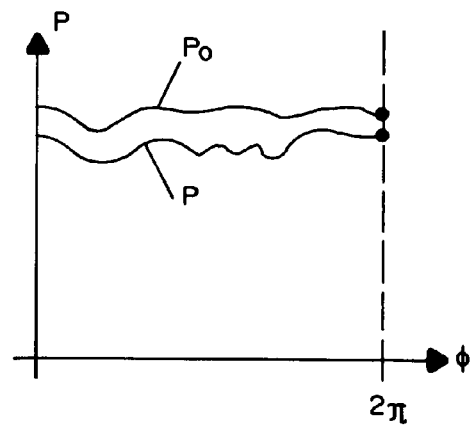

The polar contour compliance (PCC) procedure is illustrated in FIG. 12.

The above polar contour profile (PCC) procedure can be generalized to 3D object profile. In such a case, we need to integrate 2D PCC with rigid body orientation procedures, well-known in image understanding, based on affine (rigid body), six-degrees of freedom (3 rotations and 3 translations) transformation and covariance matrix formalism.

Step 3. Multifacet Inhomogeneous Compression (MIC)

The third step of the PATURT kernel is a new type of real-time video compression, called Multifacet Inhomogeneous Compression (MIC), a subject of this invention. After STEP1 and STEP2 have been completed, the frame area has been divided on various ROIs, and remaining background. For real-time purposes the STEP 1 and 2 operation must be done only in fraction of frame duration (30 msec), or in several milliseconds. For Ultra-Real-Time (URT) purposes, such operation must be done in a fraction of a millisecond. The remaining part of frame duration is attached to intraframe compression. However, interframe compression is also possible within the PATURT kernel. Very often, in the case of intraframe compression, other frame operations, such as crypto-coding, and watermarking, must be accomplished during frame duration (30 msec for real-time). Therefore, all the PATURT kernel operations must be designed within a very tight time-budget schedule, satisfying the relation:

$$t_{1,2} + t_c + t_R \le t_F \tag{15}$$

where $t_{1,2}$ is time of steps 1 and 2, $t_c$ is compression time (STEP3), $t_R$ is remaining time for crypto-coding, watermarking, or other image hardening operations, and $t_F$ is frame duration, which for VGA video is 30 msec, and for Ultra-Real-Time (URT) operations is 1 msec, or even shorter.

Figure 13:
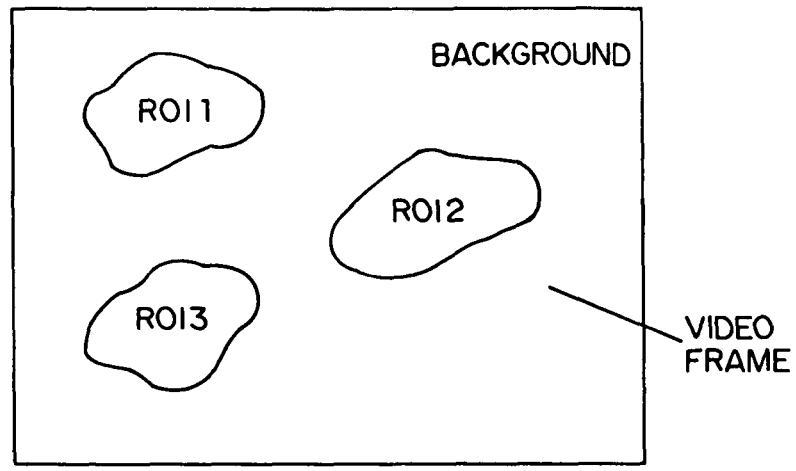
FIG. 13 illustrates steps 1 and 2 of the PATURT kernel including selection of principal signatures (step 1) and edge extraction (step 2) of a particular video frame having three regions of interest.

The definition of a video frame after STEPS 1 and 2, is shown in FIG. 13.

The essence of the Multi-Facet Inhomogeneous Compression, or MIC, is in dividing the video frame by various ROIs, and background, as in FIG. 10, where various ROIs can be compressed differently, and with different compression ratios: $C_1, C_2, \ldots$, et cetera, as well as background. Different compression methods, well-known in the prior art, can be MPEG-1, MPEG-2, MPEG-4, wavelet, or others, some of them (MPEG-1) quoted in papers (see "Soft Computing and Soft Communication (SC2) for Synchronized Data" by T. Jannson, D. H. Kim, A. A. Kostrzewski and V. T. Tamovskiy, Invited Paper, SPIE Proc., vol. 3812, pp. 55-67, 1999) of the assignee hereof. The value of C-ratio can be different for each region.

For sake of simplicity, consider the case where all ROIs are compressed by the same C-ratio, equal to $C_1$, and the background is compressed by $C_2$. Assume the frame fraction of all ROIs is k, then the fraction of frame background is (1−k).

Figure 14:
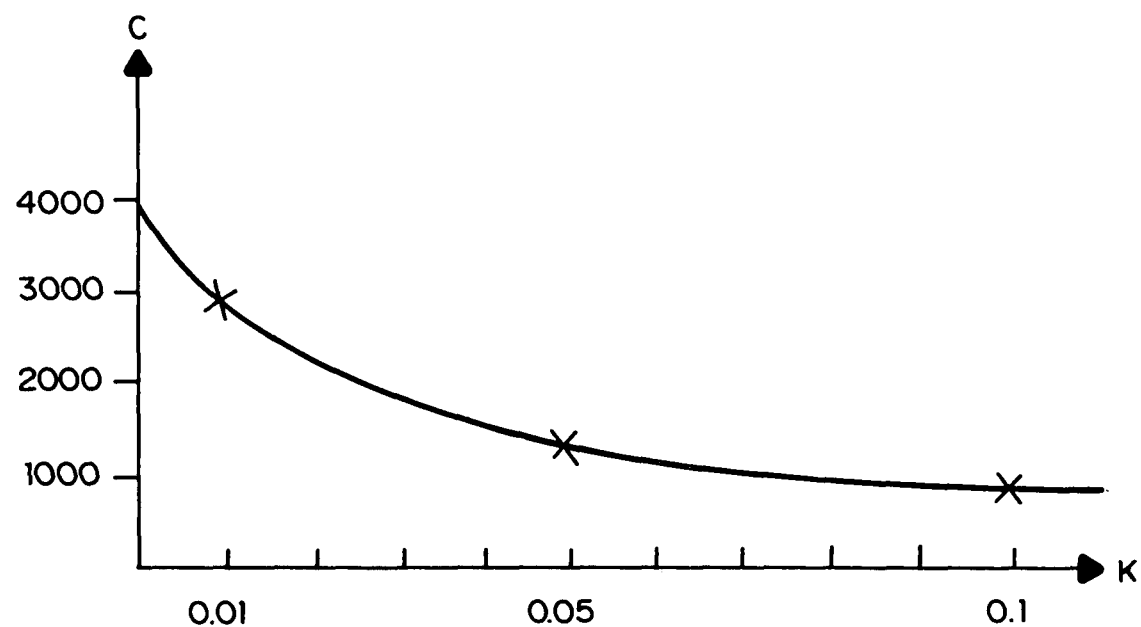
FIG. 14 is a graphical illustration of compression ratio versus ROI frame fraction "k"

Assume the original video bandwidth as $B_O$, and video transmission bandwidth as B; then we have $$B_o = kB_o + (1-k)B_o \tag{16}$$

and $$B = \frac{B_o}{C} = \frac{kB_o}{C_1} + \frac{(1-k)B_o}{C_2} \tag{17}$$

thus, we obtain $$\frac{B}{B_o} = \frac{1}{C} = \frac{k}{C_1} + \frac{(1-k)}{C_2} \tag{18}$$

where C is video compression ratio. We see that relation (18) has the form of a parallel connection, similar to that for parallel resistances in the electrical circuits. Therefore, the smaller C-ratio dominates, and for $C_1 \ll C_2$, $C \sim C_1$, and for $C_1 \gg C_2$, $C \sim C_2$. For example, for k=0.1 (typical value for ROIs), $C_1$=100, and $C_2$=4000, we obtain C=833; while for k=0.05, $C_1$=100, and $C_2$=4000, we obtain C=1351. Also, for k=0.01, $C_1$=100, and $C_2$=4000, we have C=2857. This relation is illustrated in FIG. 14.

Usually, $C_1 \ll C_2$, because we would like to protect image information in the ROI-areas. However, sometimes we would like to scramble information in the specific ROI-area for privacy purposes. Then, for such privacy-protected area, $C_1$-value can be very large; e.g., 10,000:1.

Figure 15:
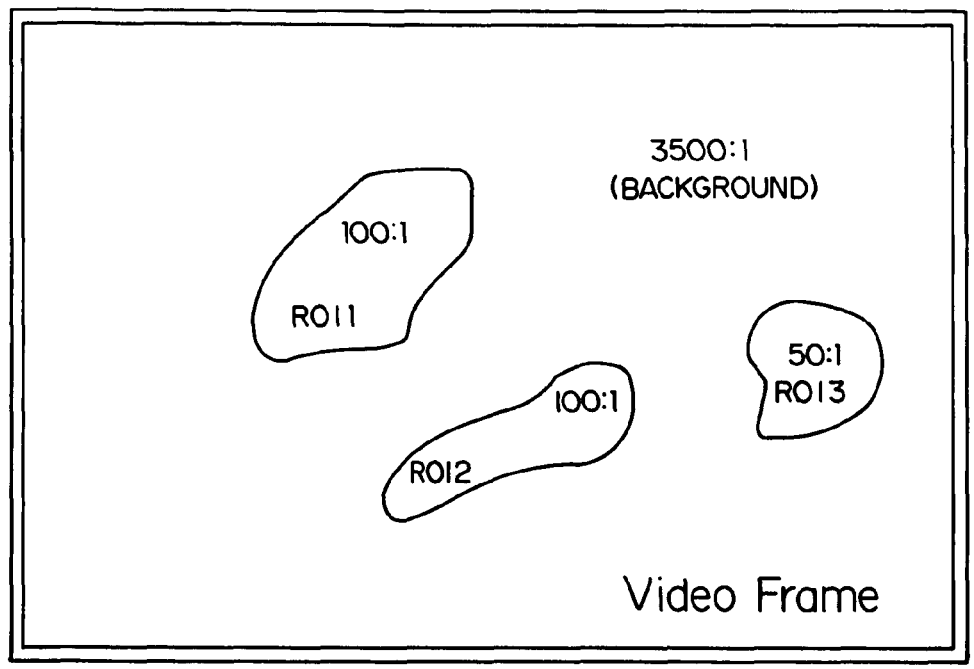
FIG. 15 is a graphical representation of Multi-Faced Inhomogeneous Compression (MIC) for an exemplary video frame having three regions of interest among a background.

In FIG. 15, the general concept of Multi-Faced Inhomogeneous Compression (MIC), for exemplary video frame, is presented, with various compression ratios (C) for ROIs (3 of them), and frame background. It should be noted that the compression methods for those regions are arbitrary.

Summary of PATURT Kernel Time-Saving Operations

We will summarize the basic time-saving operations of the PATURT kernel (engine). By "time saving," we mean both saving of computing time and transmission bandwidth. Those savings have different meanings, however. In particular, the "saving of computing time" means such simplifying of the computing operations that they can be done in millisecond time scale, being based on low-cost parallel computing and pixel revolution such as the PATURT IFD/NF. The "saving of transmission bandwidth" means sufficiently high compression ratio (C). On the other hand, both savings are related to the PATURT kernel which combines both computing and compression features. In this case (i.e., in the case of PATURT innovation) we mean both savings, emphasizing the first one, since the first one is the basis for the second one.

Since, all operations of the PATURT kernel must be real-time (RT), or even ultra-real-time (URT), especially in the case of the compression path (see FIG. 2), we would like to summarize here all the basic features of these operations, which are as follows:

(1) Pixel filtering/decimation
(2) Novelty filtering
(3) Reduced Pixel-by-pixel (or, pixel-to-pixel) subtraction
(4) Edge smoothing Feature (4) is based on the fact that the "edge" is defined as a continuous line, or a segment of a line. Therefore, the pixel decimation does not prevent the edge definition, except the edge remains "fuzzy", as in FIG. 8C.

The feature (2) discussed in such a way that by subtraction of pixel intensities from two identical frames, we obtain amplification of those frame areas which have abrupt changes of pixel intensities, such as edges, or contours of ROIs.

Morphine Compression (Alternative Path)

Morphing compression, also a subject of this invention, can be used as an alternative compression path, as in FIG. 2, instead of the MIC, as in FIG. 15, or as complementary to the MIC, as well as to the compressions based on M-frames. For the sake of clarity we refer to them in the following manner:
A) Hypercompression 1 (based on M-frames); hereafter HYPERCOMP1
B) Hypercompression 2 (MIC); hereafter HYPERCOMP2
C) Hypercompression 3 (morphing); hereafter HYPERCOMP3.

Figure 16:
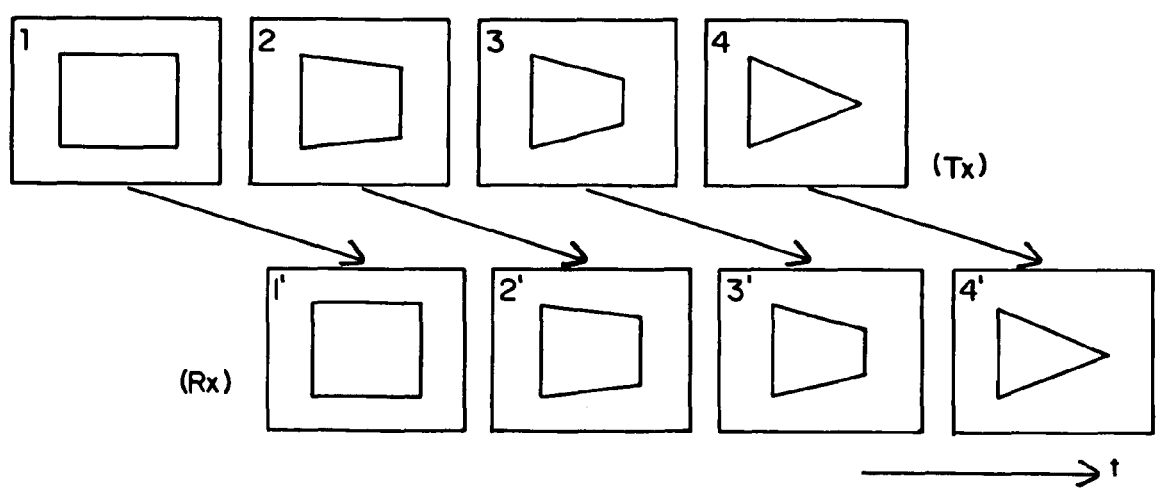
FIG. 16 is an illustration of the principle of Predictive Morphing Compression (PMC) for four transmitted video frames.

Morphing Compression, an entirely new compression concept, is based on an analogy to biologic metamorphosis, or transformation of one form into the other by slight changes. In analogous ways, video frame object, or ROI, changes its form from one frame to another. The basic idea of Predictive Morphing Compression (PMC) is slight forward correction of frame ROIs, or objects, based on pre-coded structures of those objects, and the fact that a video transmitter "knows" about the video stream, at least one frame in advance. This is, because, the video transmitter ($T_x$), or video-encoder sends a video frame only when it has already been processed (compressed). Therefore, the video receiver ($R_x$), which is typically software-only in the PATURT invention, obtains such frame, one-frame-later (or, a few frames later, in more complex inter-frame compression schemes); i.e., with 30 msec-delay, for typical video scheme. Therefore, if the frame is well-structured, it can be forward-corrected, in a similar way as errors can be corrected in forward-bit-correcting systems, which are "well-structured" by bit parity rules. In the case, when such forward correction applies only to ROIs, the PMC is the part of the MIC. In more general cases, the PMC is broader than the MIC. FIG. 16 illustrates the PMC principle.

Figure 17:
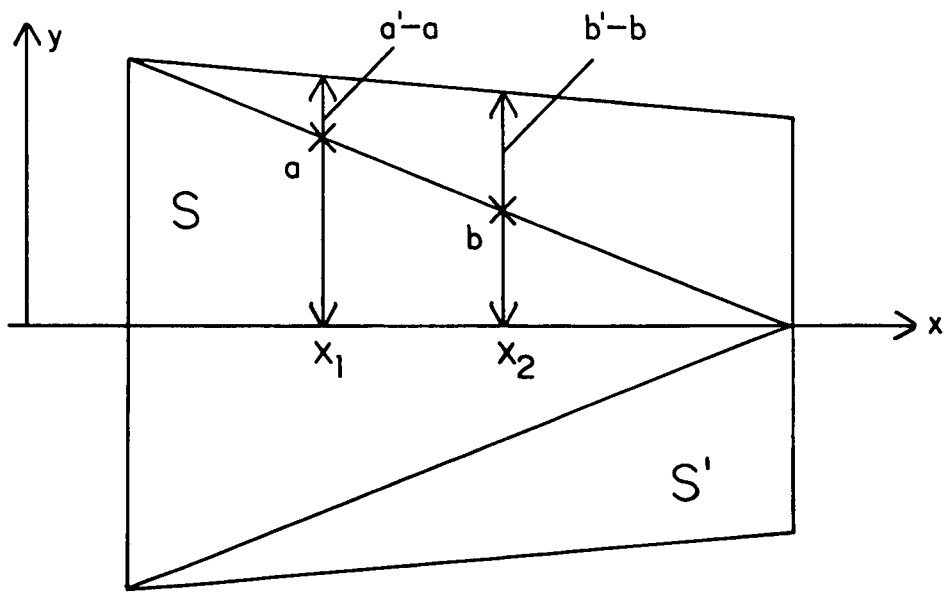
FIG. 17 is a graphical illustration of the rules of Sealed-Affine-Transforms (SATs) for morphing compression of a shape S into a shape S'.

Transmitter's knowledge of frame (2), one-frame-in-advance (see arrows in FIG. 16), allows modification of receiver frame ($2^1$), assuming that both are well-structured. By "well-structured" we mean that they are organized ("formatted") within a skeleton, based on Scaled-Affine-Transforms (SATs), which are digital video versions of the mathematical Affine Transforms. An example of such SAT is shown in FIG. 17, where the SAT is in the form of an instruction, such as that y-coordinate of the ROI edge location: $x=x_1$ must by rescaled ("stretched") by (a/a)-factor, which is a specific number. Such instruction can be in the form of "IF-THEN" crisp conditional sentence, such as:

IF(ROI)=(ROI1), AND $x=x_1$, THEN RE-SCALE

Y-COORDINATE BY $(a^1/a)$-FACTOR EQUAL TO 125%. (19)

The crisp sentence (Equation 19) can be replaced by the "fuzzy" sentence, which is a generalization of Equation 19 based on fuzzy logic and membership functions. Fuzzy logic is well explained in "Fuzzy Logic and NeuroFuzzy Applications Explained" by Von Altrock C., (2002), ISBN 0-13-368465-2.

In summary, morphing compression is based on transforming pixel-based algorithmic rules, typically used in digital video processing/compression, into algebraic (mathematical rules (REPRESENTING OBJECTS) based on SAT rules. Such SAT rules require only a few bits to transmit instruction, such as Equation 19. If the prediction is correct, then tremendous saving of transmission bandwidth is achieved, equivalent to a very high compression ratio.

By applying the SAT rules for whole video frames, we can achieve very high compression ratio, up to 100,000:1.

STEP 4. Nearly-Real-Time ATR, as an Alternative Path to STEP 3

The Nearly-Real-Time (NRT) Automatic Target Recognition (ATR) is the alternative path to STEP 3 (MIC compression). In the case of NRT/ATR, the time of operation is not real-time, but almost-real-time, a few seconds. In such a case, the selection of principal signatures (motion, color, spectral, texture, shape, aspect ratio), is similar to pre-ATR, except they are expanded into more complex versions. In addition, the METADATA, in the form of "IF-THEN" instructions are introduced, in a similar way as those for SAT morphing compression. In the latter case, the invention is a contribution to MPEG-7 standard, as in "Introduction to MPEG-7" by B. S. Manjunath, P. Salembier and T. Sikura, (eds.), Wiley, 2002, in the form of so-called logic templates, as in "Sensor and Data Fusion" by L. A. Klein, SPIE Press, 2004. The NRT/ATR-expansion of pre-ATR signatures is discussed below.

Motion Signatures

In such a case, in addition to the ROI extraction, we provide the NRT/ATR in the form of specific signatures characterizing speed vector flow value in the specific speed range and/or direction. In such a case, we need to extract 2D or 3D real vector value from camera movement by triangulation, as in "Real-Time Pre-ATR Video Data Reduction in Wireless Networks" by T. Jannson and A. Kostrzewski, SPIE Proc., vol. 6234-22, 2006. We can also implant expert information in the form of "IF-THEN" sentences. For example, we can consider only those objects that move with speed in the range of 20-60 mph into east-north direction, by adding the following conditional sentence:

IF OBJECT SPEED IS IN THE RANGE OF 20-60 MPH AND IF

SPEED VECTOR DIRECTION IS WITHIN 45°-135° ANGLE,

THEN MOVING TARGET IS PROBABLY NOT FALSE TARGET. (20)

We apply here a sensor fusion rule as in FIG. 3, in order to eliminate false targets. It should be noted that Equation 20 implements METADATA directly into the context, as in MPEG-7 standard.

Color/Spectral Signatures

By applying the RGB rule as in FIG. 5, we provide full color matching. In a more complex version of this, we apply full color spectral matching by applying the compliance parameter, as in FIG. 12, except the angular coordinate, as in Equation 14, is replaced by a wavelength coordinate.

Motion Trajectory Matching

In such a case, we develop 6D-Motion Trajectory for a specific rigid body (e.g., missile), projected into cameras' (IR sensors) view, and compare with a video stream sample representing real body movement. Such sequence of video frames (at least, seven of them) can accurately differentiate a motion of real missile (true target) from a movement of its decoys (false targets). This is because the missile decoys cannot be as massive as real missile. Otherwise, the power budget of a missile system would be cost-prohibitive, or power-prohibitive, or both.

Other Signatures

Other signatures such as texture, shape, and aspect ratio, can be also analyzed within the NRT/ATR-frame. For example, a pilot's face position. It should be noted that by introducing a large number of signatures (larger than three), we are automatically moving to the NRT regime, because the time of operation will be extended over 30 msec, which prevents the real-time operation.

PATURT Watermarking

Another subject of the invention, PATURT watermarking, applies two novel features, in combination. The first novel feature is in applying video watermarking (which is alternating the video image, without perceptual change, while adding some hidden (invisible) information for authentication, or security purposes), only into frame regions, outside ROIs, which have already been selected by either the PATURT kernel, or by a prior-art method. The second novel feature is in alternating only bits of lowest importance which are the last bits of binary intensity numbers. For example, for 256-gray levels per pixel, or 8 bpp, the intensity value is described by:

$$(10110101) = 1\cdot 2^7 + 0\cdot 2^6 + 1\cdot 2^5 + 1\cdot 2^4 + 0\cdot 2^3 + 1\cdot 2^2 + 0\cdot 2^1 + 1\cdot 2^0 = 128 + 32 + 16 + 4 + 1 = 181 \quad (21)$$

We see that changing the last bit from "1" to "0" will change intensity value, only from 181 to 180; thus, intensity value is almost unchanged.

To make the watermarking information even more hidden, we can alternate only those bits which satisfy some extra criterion, contextually corrected with PATURT structure, such as those corrected only with red color, above some threshold value, for example.

PATURT MPEG-7 Object Representation

Figure 18:
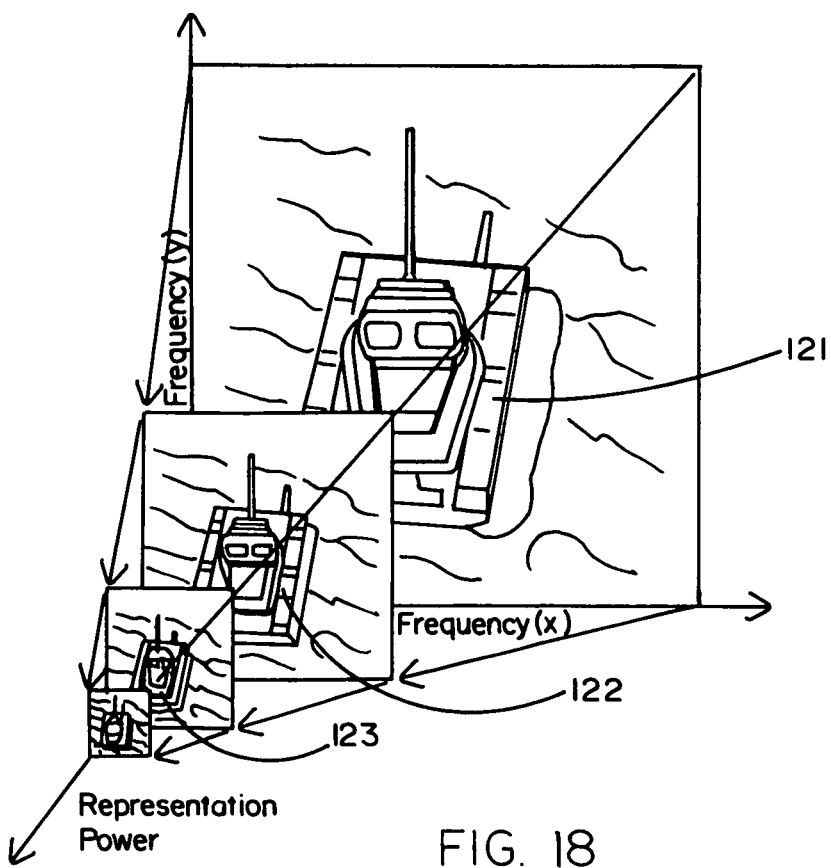
FIG. 18 is a representation of Phase-Space Gaussian Mixture used by PATURT to represent an object.

The most advanced MPEG-7 standard implements the signatures' designators, such as color into the video image itself. Before MPEG-7, those designators had been independent entities, attached as metadata into an image. The PATURT executes the MPEG-7 standard. PATURT object representation effectively reduces the number of pixels required to represent an object, significantly reducing the number of operations required for feature extraction, matching and recognition, yet keeping intact the most important spatial signatures, including shape, color, texture, size, and aspect ratio. Specifically, we use a Phase-Space Gaussian Mixture (PSGM) representation, to derive a compact, efficient, and low-pixel-count representation of original full-resolution object images. The advantage of our PSGM representation is that the model accuracy can be dynamically adjusted to satisfy different computation and communication constraints. One example of such representation is shown in FIG. 18, where an example video frame is presented.

PATURT Phase-Space Gaussian Mixture Object Representation, consists of multi-resolution approximation images generated from original full-resolution images using Wavelet Gaussian Mixture framework, with preservation of the most important spatial signatures, including shape, color, texture, size, and aspect ratio. The largest image is the full resolution of an object image. The smallest image is the lowest-resolution object image. As the size reduces, the representation power of the object image increases because of increased generalization. The size of the smallest image is 1/16 of the size of the full resolution image, occupying 1/16 of original spectrum.

The Phase-Space Gaussian Mixture (PSGM) representation combines the compact and efficient representation capability of the well-known wavelet transform and the statistical description capability of the well-known Gaussian Scale Mixture (GSM) to capture the statistical spatial signatures in an object. In fact, GSM has been proven to be excellent descriptors of local clusters of wavelet coefficients in natural images (see "Image Restoration Using Gaussian Scale Mixtures in Overcomplete Oriented Pyramids" by J. Portilla, SPIE Proc., vol. 5914-50, 2005). By use of a tractable statistical model such as GSM, we can summarize the statistical properties of the objects in the videos using only a handful number of parameters, instead of thousands of individual bits. Moreover, we can reconstruct the high-frequency local motions from the summarized statistical parameters with good accuracy.

The PSGM framework uses an oriented pyramid to capture both the marginal and the joint statistical properties of local wavelet coefficients. The multi-resolution pyramid is first generated using wavelet transform, i.e.

$$I = \{S_0, \{W_0, \ldots, W_N\}\} \quad (22)$$

where I is the input object image, $S_0$ is the lowest resolution image, $W_{0 \ldots N}$ are the oriented wavelet coefficient matrices at different phase-scale that can be expressed as follows:

$$W_i = \{A_i, D_i\}, i = 0, \ldots, N \quad (23)$$

where $A_i$ is the magnitude and $D_i$ is the direction of the wavelet coefficients. The computation of the oriented wavelet coefficient matrices is first through standard wavelet transform, and then computation of the magnitude $A_i$ and direction $D_i$ from coefficients from horizontal, vertical and diagonal wavelet bands. The computation of $S_0$ is through standard wavelet transform.

At each scale i, a small patch of wavelet coefficients $W_i$ with different positions, orientations and scales is modeled as a GSM, i.e.

$$X = \sqrt{z}u \quad (24)$$

Where X is the wavelet coefficient magnitudes arranged in vector form, z is a hidden positive scalar random variable, and u is a zero mean Gaussian vector with variance σ. Therefore, the entire vector of wavelet coefficient magnitudes can be represented by just two parameters. When in reconstruction, an estimation of wavelet coefficients can be generated using z and a, and then followed by a standard wavelet reconstruction process. The reconstructed image will have the same statistical properties as the original image.

As a result, the original full-resolution image can be represented as a collection of low-resolution image and phase-scale Gaussian vectors, i.e., $$I = \{S_0, \{\{z_i, \sigma_i, D_i\}_{i=0, \ldots N}\}\} \quad (25)$$

The spatial properties of $S_0$ can be used as the basic features of the object for PATURT recognition, while $\{z_i, \sigma_i, D_i\}_{i=0, \ldots, N}$ can be the supplement features of the object to refine matching accuracy.

This combination of the well-known wavelet transform as in Equation 22, and the GSM, as in Equation 24, is a subject of this invention.

Applications

Video Downloading

Video downloading is a very important method in such applications as video transmission from aircraft to the ground, ship, other aircraft, and other platforms. In such a case, the video data should be properly hardened, the PSNR should be maximized, and transmission bandwidth should be maximally reduced. In particular, for such applications as a VAD (Video-Audio-Data) recorder, it is important to download VAD data after aircraft has landed.

Minimizing Downloading Time

Minimizing download time, $t_D$, is essential for the effective downloading of the recorded data, which is a subject of this invention. Assuming specific recorded data volume, V, in gigabytes, or GB (1 GB=8 Gb), this time depends on downloading bandwidth, $B_D$, with which these data are downloaded, in the form:

$$t_D = \frac{V}{B_D}. \quad (26)$$

For example, for V=1 GB, and $B_D$=400 Mbps, we obtain $t_D$=20 sec; but for V=100 GB, and the same downloading bandwidth, we have $t_D$=2000 sec, or 33 min., which is a rather long time. In order to shorten this time, we can either increase $B_D$, or provide parallel downloading connection (PDC). In the first case, by increasing bandwidth to 1 Gbps ($B_D$=1 Gbps), we have:

$$t_D/1 \text{ GB}=8 \text{ sec}, t_D=100 \text{ GB}=800 \text{ sec}=13 \text{ min}.$$

In the second case, by providing Mth-parallelity, Equation 22 becomes:

$$t_{D'} = \frac{V}{M \cdot B_D}. \quad (27)$$

So, of course, the downloading time will be reduced M-times. The next issue is to download the maximum amount of video-recall-time, $t_1$, while minimizing downloading time, $t_D$. It is very ineffective to record uncompressed (C=1) video data. For example, for typical video bandwidth of 256 Mbps, and for 1 GB-memory, we can record only seconds of video data (a movie, for example):

$$t_0 = \frac{V}{B_0} = \frac{1 \text{ GB}}{256 \text{ Mbps}} = \frac{8 \text{ Gb}}{256 \text{ Mbps}} = 30 \text{ sec}. \quad (28)$$

i.e., we can record only 30 sec of regular video movie by using 1 GB-memory. However, by applying compression ratio, C=1000, this time, $t_1$, will increase C-times, to 8.33 h, in the form:

$$t_1 = \frac{VC}{B_0} = Ct_0 = 30 \text{ sec} \times 1000 = 8.33 \text{ h}. \quad (29)$$

Table 1 shows video recall times, recorded in 1 GB memory with various compression ratios.

TABLE 1

| Recall Times Recorded in 1 GB Memory | | | | | |
|---|---|---|---|---|---|
| C | 1 | 10 | 100 | 1000 | 4000 |
| $t_1$ | 30 sec | 5 min. | 50 min. | 500 min. | 2000 min. |
| | 0.5 min. | 0.08 h | 0.83 h | 8.3 h | 33.3 h |

The relation between downloading time $t_D$, and the recall-time-recorded-in-memory, with compression ratio C, is $$t_D = \frac{t_1 B_0}{C \cdot B_D}; \quad (30)$$

where $t_D/t_1$-ratio characterizing overall efficiency of downloading. Thus, such efficiency, $\eta_D$, can be defined as:

$$\eta_D = \frac{t_1}{t_D} = \frac{C \cdot B_D}{B_0}. \quad (31)$$

For example, for C=1000, $B_D$=400 Mbps, and $B_0$=256 Mbps, we obtain $\eta_D$=1562; i.e., during 1 sec of downloading we can download 1562 sec of, say, TV-time. The above has focused on video data, as the most-bandwidth-consuming. Considering now multimedia data: video, audio, sensor data+ metadata, the total data bandwidth, $B_0$, is a superposition of three bandwidths that occupy different fractions of this bandwidth: $k_1$, $k_2$, and $k_3$, such that: $k_1+k_2+k_3=1$, and $$B_0 = k_1 B_0 + k_2 B_0 + k_3 B_0; k_1 + k_2 + k_3 = 1. \quad (32)$$

This formula is a generalization of Equation 16. By applying compression ratio, $C_1$, the original bandwidth $B_0$, is reduced into ($B_0/C$)-value, in the form:

$$B = \frac{B_0}{C} = \frac{k_1 B_0}{C_1} + \frac{k_2 B_0}{C_2} + \frac{k_3 B_0}{C_3}, \text{ or} \quad (33)$$

$$\frac{1}{C} = \frac{k_1}{C_1} + \frac{k_2}{C_2} + \frac{k_3}{C_3},$$

which is the generalization of Equation 18. This parallel connection formula can be transformed into more familiar form of parallel connection of "compression resistances": $R_1$, $R_2$, $R_3$, such that $$\frac{1}{C} = \frac{1}{R_1} + \frac{1}{R_2} + \frac{1}{R_3}, \quad (34)$$

and, $$R_1 = \frac{C_1}{k_1}, \quad R_2 = \frac{C_2}{k_2}, \quad R_3 = \frac{C_3}{k_3}. \quad (35)$$

These "compression resistances" represent their contributions into compressed bandwidth, B: lower resistance, higher contribution (in electrical analogy: lower resistance, higher contribution to current). The electrical analogy is shown in FIG. 16. Such general form as Equation 34 allows application of the well-known feature of the resistance parallel connection that C-value must be smaller than the smallest of $R_1$, $R_2$, $R_3$, called $R_{min}$:

$$C < R_{min} \quad (36)$$

We assume here that $C_1$ represents video, $C_2$ represents audio, and $C_3$ represents sensor data, and metadata (text, messages). Table 2 shows one such example, and Table 3 another one.

TABLE 2

| Example of Bandwidth Distribution (C = 278) | | | |
|---|---|---|---|
| | Video | Audio | Data |
| $k_{1,2,3}$ | 92% | 7% | 1% |
| $C_{1,2,3}$ | 1000 | 100 | 5 |
| $R_{1,2,3}$ | 1087 | 1428 | 500 |

TABLE 3

Example of Bandwidth Distribution (C = 526)

|  | Video | Audio | Data |
|---|---|---|---|
| $k_{1,2,3}$ | 92% | 7.9% | 0.1% |
| $C_{1,2,3}$ | 1000 | 100 | 5 |
| $R_{1,2,3}$ | 1087 | 1266 | 5000 |

From Tables 2 and 3 we see that the condition (36) is indeed satisfied; since, in Table 2, $R_{min}=500$, while C=278, and in Table 3, $R_{min}=1087$, while C=526.

The second important property of this parallel connection can be found from the binary case, represented by Equation 18, which can be rewritten in the form:

$$\frac{1}{C} = \frac{k}{C_1} + \frac{(1-k)}{C_2} = \frac{1}{C_1} + (1-k)\left(\frac{1}{C_2} - \frac{1}{C_1}\right). \quad (37)$$

We see that for $C_1 > C_2$, we have $$\left(\frac{1}{C_2} - \frac{1}{C_1}\right) > 0;$$

thus, $C < C_1$, and vice versa. Therefore, C-value must be always located between larger and smaller values of $C_1$ and $C_2$, as shown in two examples presented at the bottom of Equation 18.

A further subject of the invention is the observation of an unexpected feature of multimedia downloading, which is such that if the sensor data can be represented in the digital mapping form, either 1D, 2D, 3D, or higher, we can apply the object-oriented compression methods (wavelet, MIC), also to these cases. Assume, for example, that we can present the sensor data in the form of 2D-maping, in 8-bit dynamic range (i.e., up to 256), as shown in FIG. 20.

Such table can be formally treated as a gray-scale image with pixel intensities equivalent to sensor values. Therefore, they can be compressed by typical object-oriented video compression methods.

Video Recording

Figure 1:
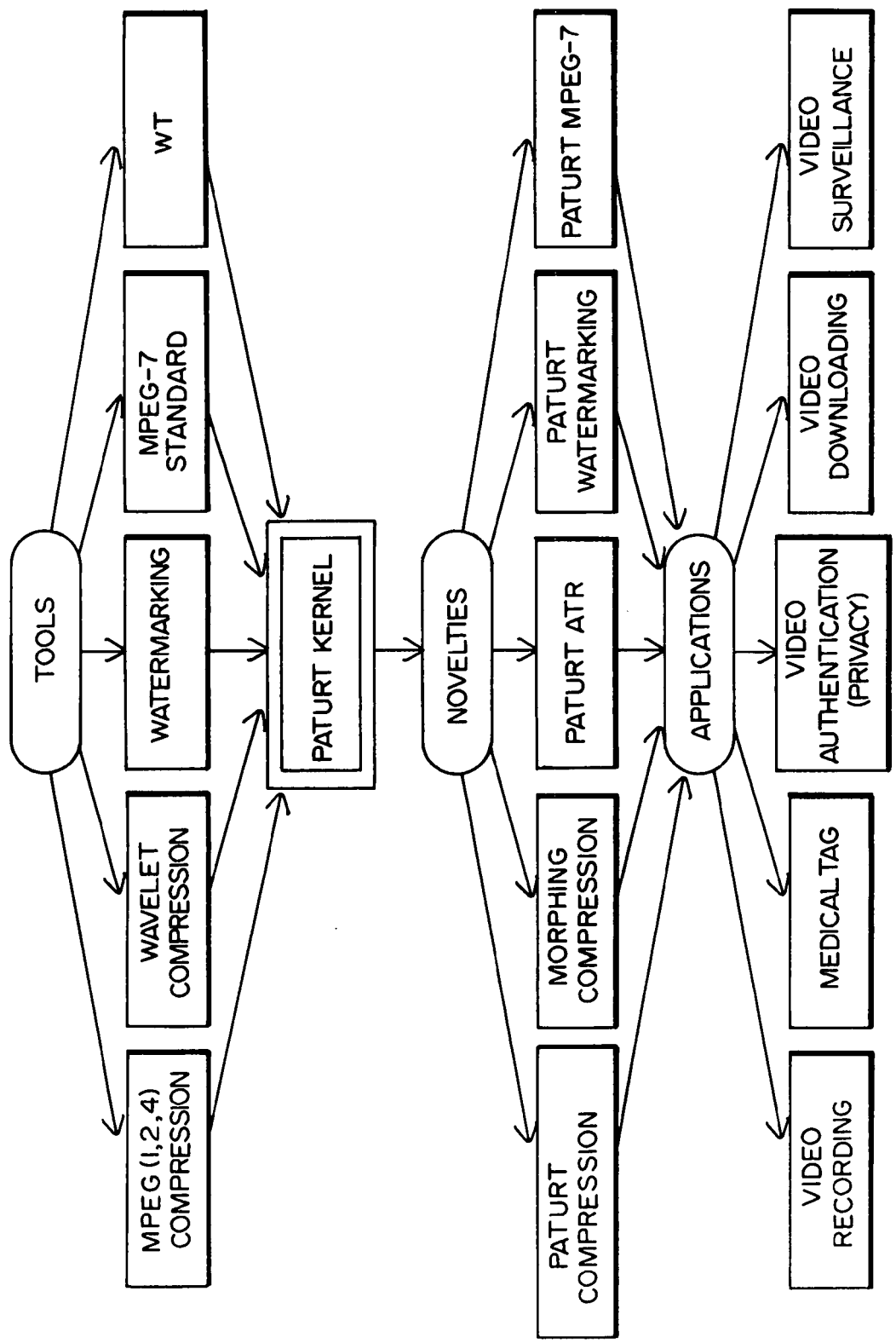
FIG. 1 is a schematic representation identifying the constituent parts, novel aspects and applications of the PATURT kernel of the invention.

Another example of a PATURT kernel application is video recording in the form of a novel FAERITO system (FAERITO's first 4 letters mean: Flight Anomalous Event Recording). The critical component of this invention is the PATURT compression, as in FIG. 1, in the form of Multifaced Inhomogeneous Compression (MIC). The MIC is intraframe compression, while still preserving relatively high Compression Ratio (CR), up to 3500:1, for background, or even higher (see FIG. 15). This is unique because, in general, it is difficult to achieve high CRs, with any type of intraframe compression. This is, in contrast to the interframe compression, such as MPEG-1, or MPEG-2 where high CRs are much easier to achieve. Of course, higher CR implies lower image quality, except the hardware image case, as discussed in "Real-Time Pre-ATR Video Data Reduction in Wireless Networks" by T. Jannson and A. Kostrzewski, SPIE Proc., vol. 6234-22, 2006, where increasing CR is necessary for improving PSNR of an image. This is, because, we then leave more space for overhead (OVH). Here, the fact that we can select different CRs for various Regions of Interest (ROI4, ROI2, ROI3, in FIG. 15) is an essential system feature, since we can use this feature in both directions: to reduce the average frame CR (for increasing image quality), or abnormally increase CR (to scramble information). The latter feature is used for Flight VAD (Video-Audio-Data) recorder, to purposely scramble pilot's faces for privacy protection.

The FAERITO invention relates generally to flight data recorders of the type used for post-flight analysis of data, audio, video, et cetera, after a crash. The invention relates more specifically to a data centric flight recorder, called Flight VAD recorder contained in a unitary lightweight housing and capable of recording a large number of (up to more than 10) hours of data, audio and video information. A crash survivable package provides either crash survivable, or removable flash memory for recording several hours of two, or more channels of high quality video, several channels (4, or more) of high quality audio and numerous channel of discrete and full range analog and digital data. Since, the major contribution to bandwidth is by video data, the effective compression of video data is essential for this invention. Another form of data transfer is data downloading. In general, the application scenario, discussed here, includes not only data securing, but also data transfer to the ground center, after flight.

All too often it becomes necessary to analyze the causes of a crashed aircraft. Such analysis frequently relies on data and audio (but not video) in what have come to be called blackboxes. These are crash-survivable containers which have recording devices such as recorders which store the last minutes of information before an aircraft crashes. Typically, there is one such blackbox used to record data and another blackbox used to record audio signals such as voice communication within the aircraft as well as over the air radio transmissions.

Such blackboxes tend to be bulky and heavy and use older (solid-state, et cetera) technology which limits the amount of data and audio that is recorded. If there is a problem with such devices for data and audio recording there is even more problem with video data which requires much higher bandwidth than that for audio, and data (hundreds of Megabits vs. Kilobits).

The prior art data and audio recording devices often have automatic beacons which begin transmitting a signal after a crash to enhance their recoverability. These blackboxes are standard equipment (but only for data and audio) in commercial aircraft, being mandated by federal regulations. However, because of their size and weight, they are not always used in military aircraft which have severely limited capacity for additional equipment (especially when it is heavy and bulky) beyond avionics and weapons control. Moreover, current crash survivable audio blackboxes are very costly and all current formats are analog and would require three separate devices to record video, audio, and data. Thus, in the event of a crash there is no blackbox to retrieve in order to determine whether the cause of the crash was due to equipment failure and/or pilot error. Recording important data (audio and data) as well as what took place in the cockpit (video) may be critical to post flight analysis and can also be used for training purposes and for review of equipment performance. Blackbox type recording systems, recording video, audio and data in single device, if made inexpensive and small enough, would be desirable not only in flight aircraft, UAVs (Unmanned Aerial Vehicle), and other aerial vehicles, but could also find advantageous use in ground transportation and security applications.

Thus, it would be desirable to provide a flight recorder that is smaller, lighter, less costly and more capable (both in multimedia data and bandwidth) then conventional blackboxes. It would be particularly useful to have a flight recorder capable of recording video, audio and data (VAD), all in a unitary package. Moreover, it would be highly desirable if such a flight recorder were capable of recording at least several channels of VAD and storing at least several hours of VAD as well, especially in a highly crash survivable configuration, or more generally, to record any anomalous events just before a crash. It is especially important to record those events, in less than 0.5 sec before crash, as well as record these events while preserving a pilot's privacy.

The present invention is in the form of fight VAD recorder, referred to herein under the trademark FAERITO, in the form of a device for recording video, audio, and data. The heart of the system is intraframe MIC compression which can achieve high CRs, in spite of the fact that it is intraframe compression. These (CR)s can be 100:1, or higher (up to 1000:1) while preserving high image quality. It can record events that occur less than 0.5 sec before crash (down to 0.1 sec or even shorter). It also preserves pilot's privacy, by selectively compressing their faces (or, other characteristic body parts) to such high CR-levels that all ID-information is lost; thus, preventing recognizing a pilot's face from video recording data. This operation is based on the PATURT kernel. The FAERITO MIC compression is defined by Equation 18, where different CRs (called $C_1$ and $C_2$) are used for different ROIs. Before the MIC, however, the frame must be segmented into ROIs, which must be done within a single, or a few frames; i.e., in millisecond scale, which is due to the PATURT kernel. FAERITO is also based on multi-media compression, defined by Equation 33 for three media (audio, video, data), which can be automatically generalized to more than three (3) media. The examples of multi-media bandwidth distribution are discussed in Tables 2 and 3. Due to the MIC, we can record C-times more multimedia data than without compression (C=1). Therefore, for C=500, for example, we can record 500-times more data than without compression. Therefore, if the memory capacity is 1 TB (one tera-byte), for example, due to C=500, we can record 500 TB of un-compressed data. Assume that, the FAERITO device has memory capacity of 1 TB, and C=100 (for high-quality video). Then for typical video bandwidth of 256 Mbps, we can record:

$$\frac{8 \cdot 10^6 \text{ Mb}}{256 \text{ Mbps}} = 31{,}250 \text{ sec} \cong 8.7 \text{ hours} \tag{38}$$

of un-compressed video data. However, for C=100, the amount of video data to be recorded with the same memory capacity of 1 TB is 100-times higher, or $$\frac{8 \cdot 10^6}{256} \times 100 = 870 \text{ recording hours} \tag{39}$$

Since contemporary flash memories are able to achieve 1 TB capacity, we can expect to obtain a very high number of hours of video stored by the FAERITO device.

The present invention comprises a flight recorder that meets the foregoing objectives. In place of three recorders (video, audio, data), the invention combines all the VAD recording functions into a single box, 6"×5"×7", weighting about only nine (9) pounds. The package of the preferred embodiment includes two digital memories, one crash survivable and the other removable, recording four hours of each VAD channel. However, the capability of the FAERITO device, allows for recording of a much larger number of video hours, as described in Equation 39, due to significant average compression ratio (e.g. 100:1). Of course, other media should be also considered, but the video bandwidth is the largest one, so special attention is given to video recording.

The All-In-One approach of recording digital VAD into a single, lightweight box, with four hours of 36 channels, in the described configuration, will more than satisfy the requirement for a digital crash survivable recorder for military aircraft. The four hours of recording can be easily expanded to eight hours or more, if needed for civilian aircraft, for example. The lightweight box with full VAD recording features would be excellent for helicopters, military aircraft, and commercial aircraft would be a next step, for the present Data Centric Flight Recorder. The technology developed for the present invention also has ground transportation and numerous security applications as well. These applications may not require the military crash survivable hardware, and could be modified for cost effective recording of VAD. Memory upgrades to eight and more hours per channel could further expand these applications.

The preferred embodiment combines all three VAD functions into one crash survivable box, with digital removable memory—a significant advantage. The weight reduction from three boxes to one is an estimated 14 pounds. The digital downloadable memory can record four hours per VAD channel, a dramatic increase in capability. The invention preferably contains two digital memory units. One is crash survivable and will withstand 3,400 g impact, and the other is a removable flash memory. The crash-survivable device has already passed several crash-survivability tests, including: 3,400 g-impact test, 1100° C./hour-temperature test, and various combinations thereof.

The data-centric flight recorder provides four (4) hours of synchronous digital Video/Audio/Data (VAD) recording per channel in the disclosed embodiment. The other embodiments include larger numbers of synchronized VAD recording, up to eight hours of recording, or even larger (or, much larger), dependent on specific applications. Two (2) video channels are included with compression, leading to 1 Mbps per channel. This video compressing reduces bandwidth while preserving video quality. While video compression has been discussed above, high compression ratios for digital audio are achieved with latest MPEG layer 3, and permit four (4) high quality audio channels (16 Kbps per channel). The invention also features eight (8) discrete sensor channels and 16 full range analog channels with programmable dynamic range and sampling rate. Data recording flexibility is achieved by providing communication busses in the form of two (2) RS 422 channels, two (2) MIL-1553 channels, and two (2) RS 222 channels in the disclosed embodiment. Many other interfaces, and larger numbers of channels, as well as longer numbers of recording hours are contemplated as additions and alternatives.

A significant feature of the preferred embodiment is a crash-survivable memory unit comprising a titanium enclosure housing a memory module and filled with Aerogel, or other appropriate material to successfully absorb shock up to at least 3,400 G's, and withstand high temperature, caused by a fire. In the preferred embodiment, such material should be in a homogenous form, without inhomogenities, cracks, or cavities within. Another important feature is the implementation of an omni-connector which is designed to be universally compatible with aircraft connectors for allowing simple integration of the present invention into existing systems. An especially unique characteristic of this omni-connector is the manner in which it is board-integrated into the recorder electronics to permit easy modification and replacement to accommodate integration changes.

Figure 21:
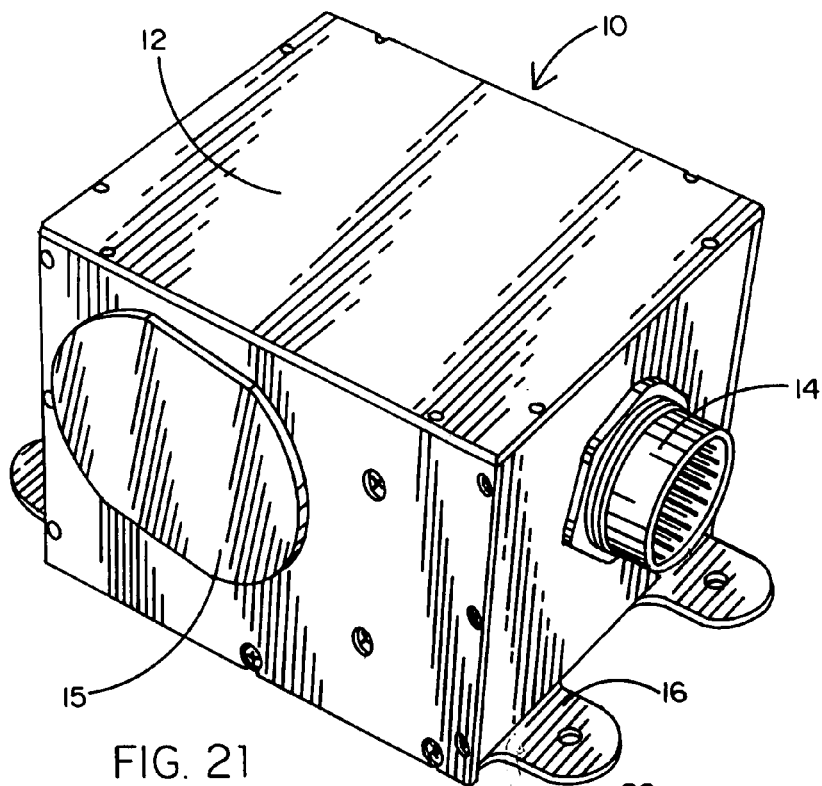
FIG. 21 is a three-dimensional mechanical diagram of a preferred embodiment of a crash survivable recorder (CSR) of the invention.
Figure 22:
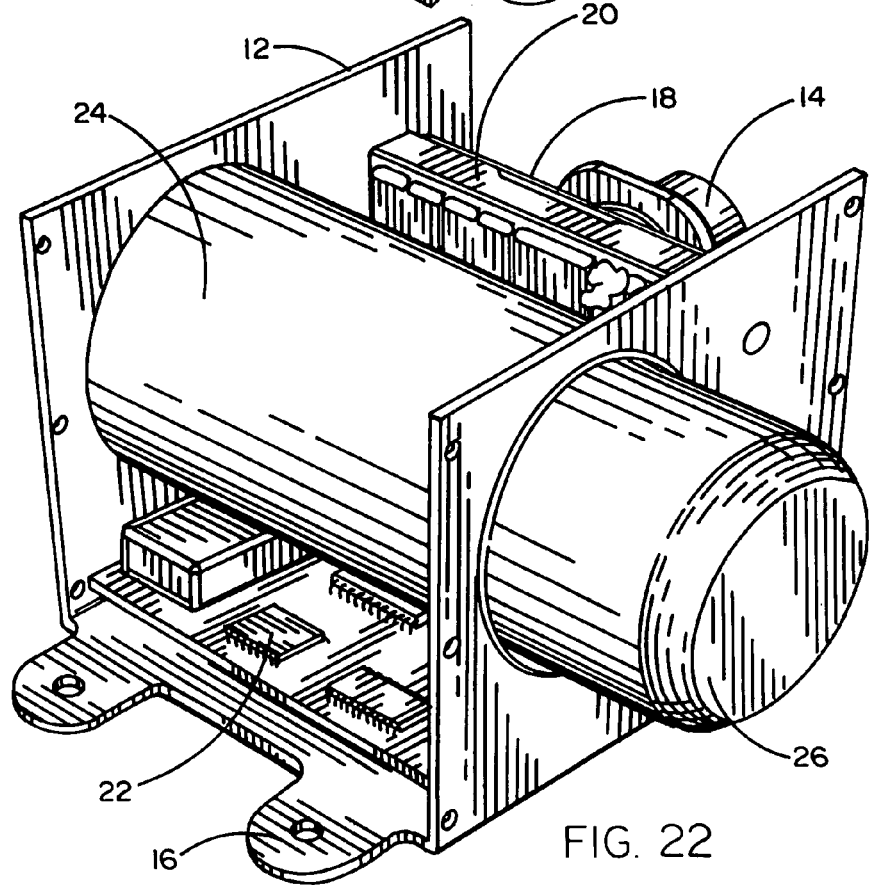
FIG. 22 is a view similar to that of FIG. 21, but with cover removed and memory unit shown partially disassembled and partially withdrawn.
Figure 24:
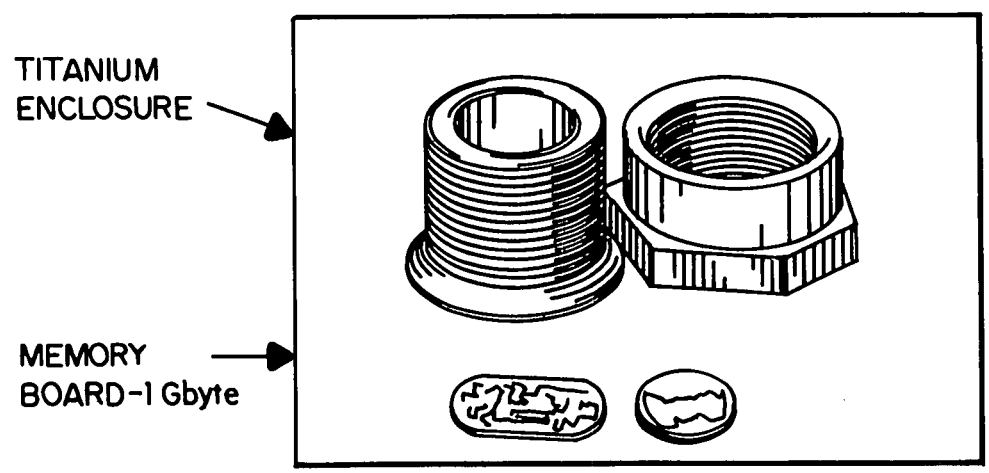
FIG. 24 is a photograph of a disassembled CSR.

Referring to the accompanying drawings (FIG. 21), it will be seen that the flight anomalous event recorder (FAERITO) 10 according to a preferred embodiment of the invention comprises a generally rectangular housing 12. In the preferred embodiment housing 12 is preferably a stainless steel structure measuring about 4"×5"×7". Extending from one surface of the housing is a multi-pin connector 14 to connect the recorder 10 to various external devices as will be explained herein. Housing 12 has a removable cover 15 which is threadably engaged with the end of a tubular container 24 shown in FIG. 22. Residing within container 24 is a removable casing 26 which encloses a crash survivable memory board (see FIG. 24). Casing 26 is preferably made of a titanium alloy and is filled with a material which cushions the memory board against at least 4,000 G's of impact acceleration in a crash. The casing is made of two threaded portions, one of which has an axially centered aperture for connecting the encapsulated memory board to the remaining electronics.

Figure 23:
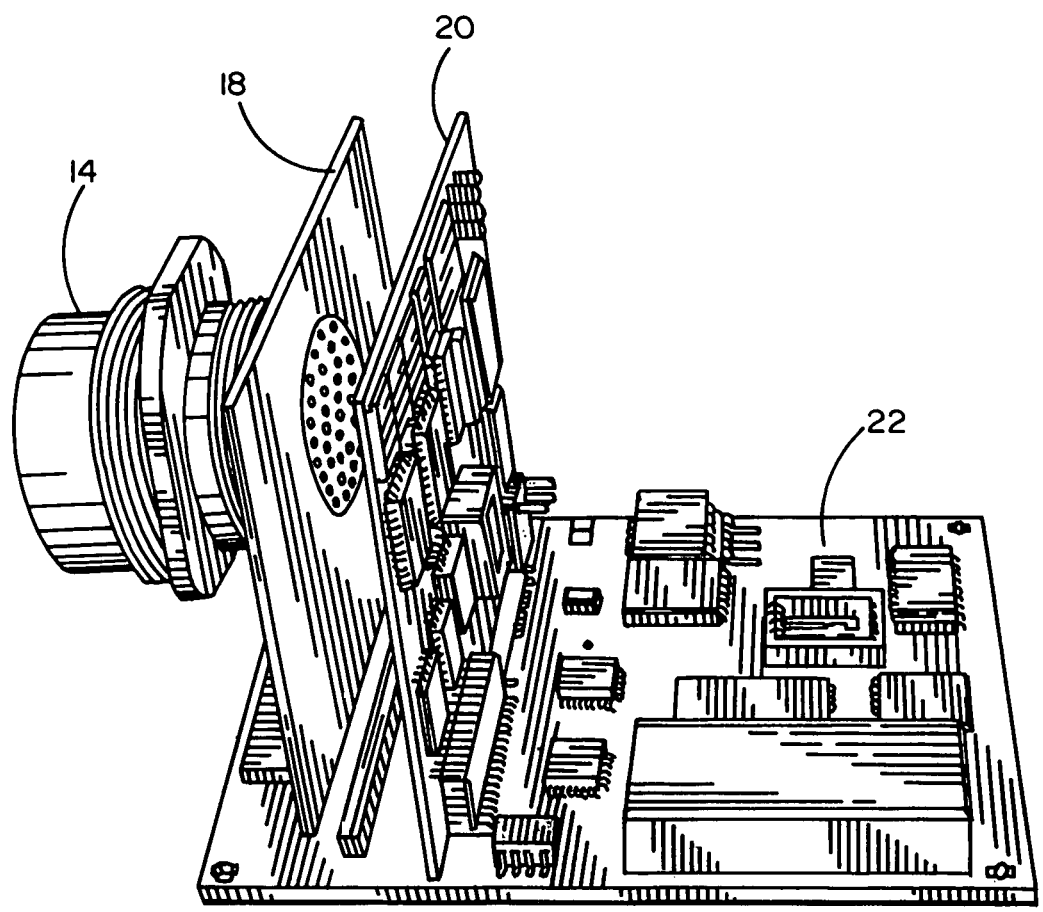
FIG. 23 is a three-dimensional mechanical diagram of the interface electronics of the CSR.

The remaining electronics are configured as shown in FIG. 23. A main board 22 receives a video slave board 20 and a connector interface board 18 from which the connector 14 extends. The electronics of the invention may be better understood by referring to FIGS. 25, 26 and 27.

Figure 25:
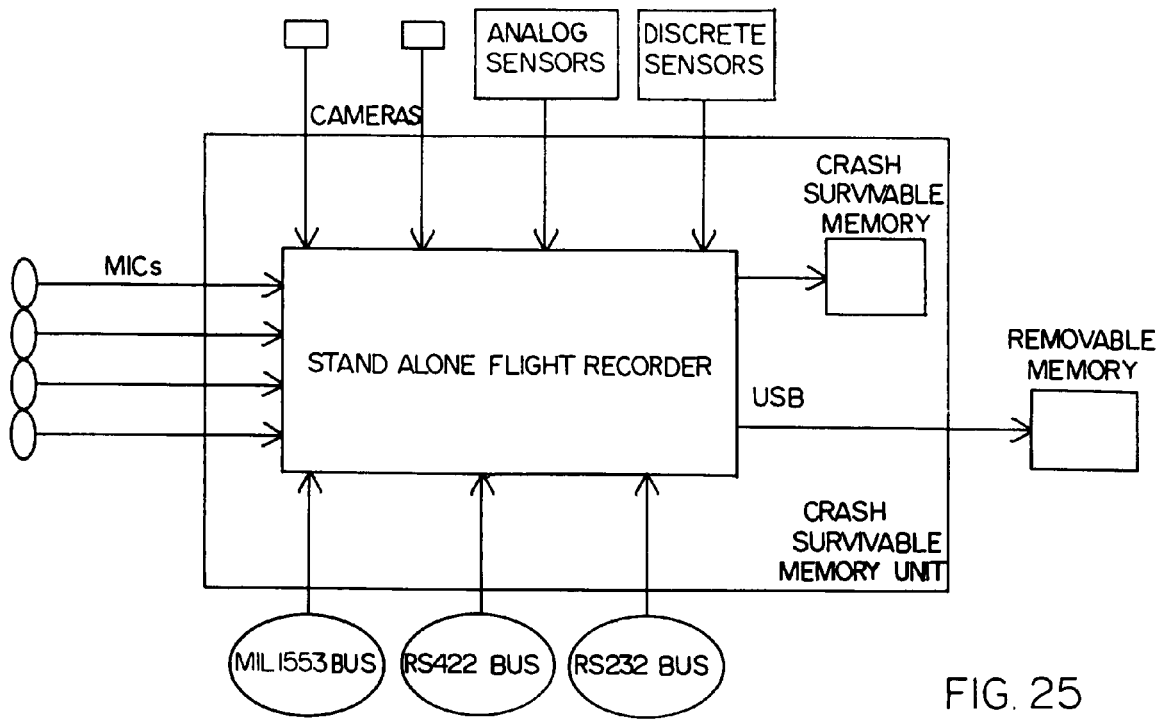
FIG. 25 is an overall system block diagram.

FIG. 25 is a top level block diagram of the entire recorder system shown connected to external buses, cameras, microphones and sensors. As seen therein, the recorder can be connected to two video cameras, four microphones as well as analog and digital sensors. In addition to the aforementioned crash survivable memory, there is also a removable memory connected through a conventional USB serial port. Various bus connections can be made including MIL-1553, RS422 and RS232.

Figure 26:
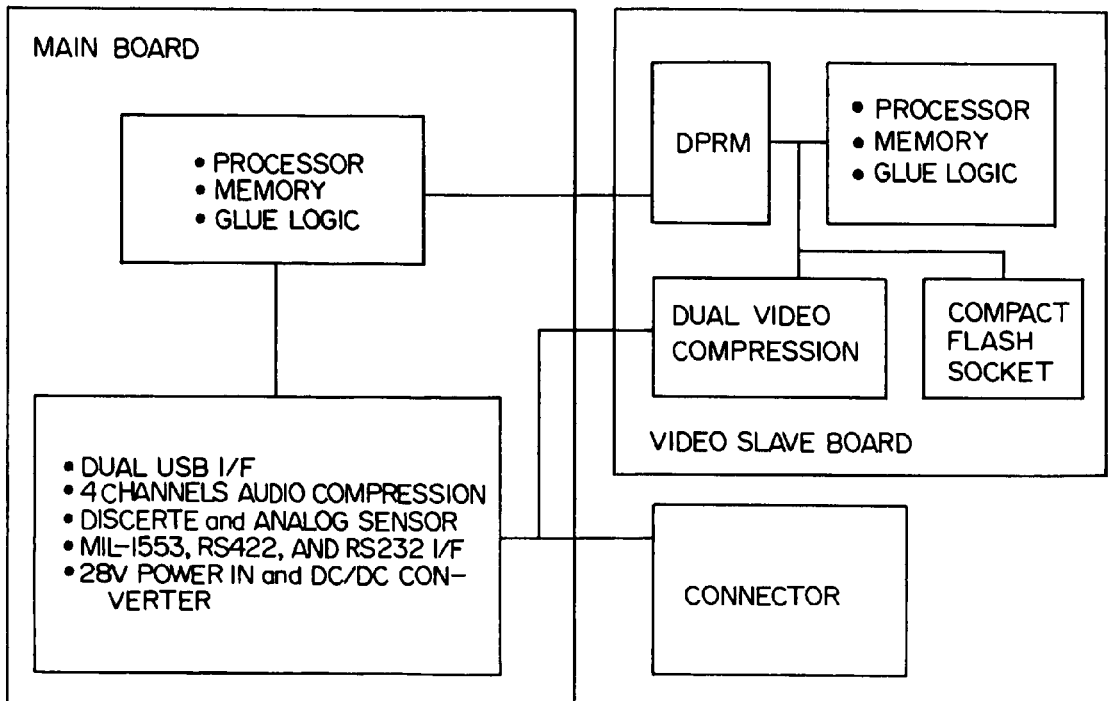
FIG. 26 is a board level block diagram.
Figure 27:
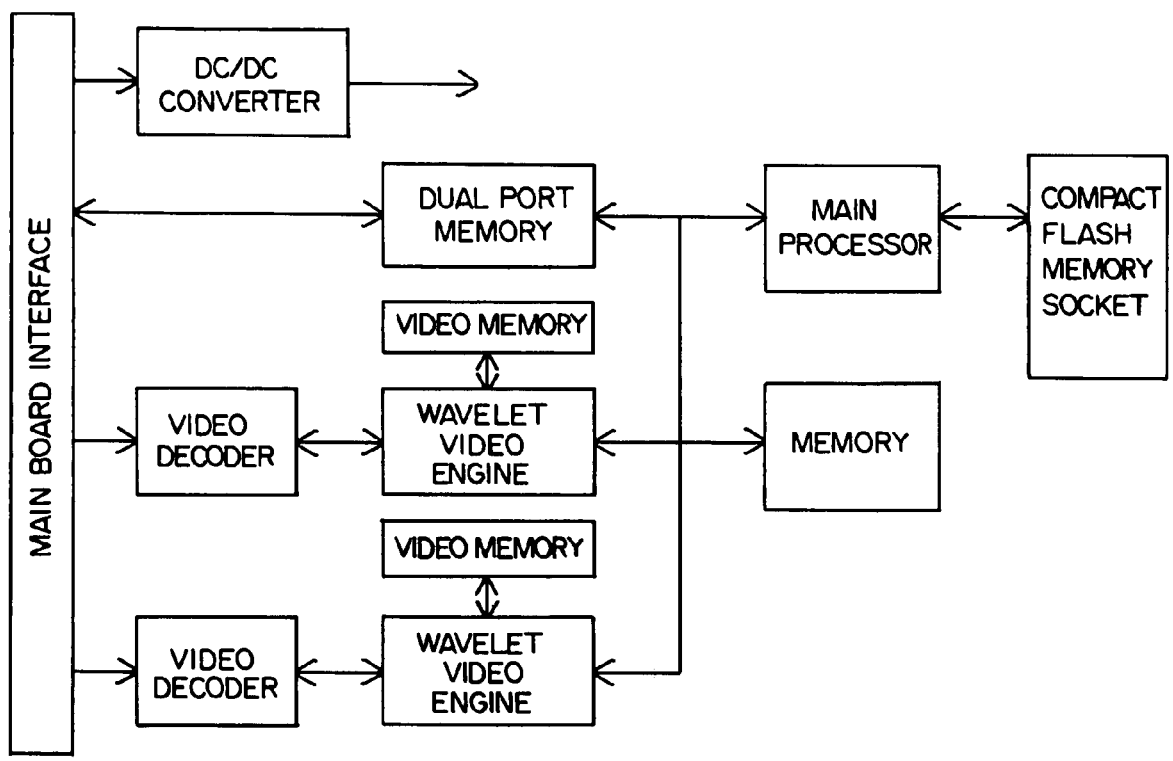
FIG. 27 is a block diagram of the video board of the preferred embodiment.

FIG. 26 is a block diagram of the recorder electronics and defines the content of the main board 22 and video slave board 20. Each such board provides a processor, memory and glue logic. The main board also provides four channel audio compression circuits at 16 Kbps per channel as well as circuits for controlling the storage of eight discrete channels and sixteen analog channels of sensor data. The video board provides dual video compression capability for recording two channels of video at up to 1 Mbps. FIG. 27 provides a block diagram illustration of the video slave board.

Having thus disclosed preferred embodiments of the invention, it will now be evident that many variations and modifications are contemplated. Accordingly, the scope hereof is to be limited only by the appended claims and their equivalents.

REFERENCES

1. L. A. Klein, Sensor and Data Fusion, SPIE Press, 2004.
2. E. Waltz and J. Llinas, Multisensor Data Fusion, Artech House, 1990.
3. T. Jannson, et al., "Mobile Acoustic Sensor System for Road-Edge Detection," SPIE Proc., vol. 6201-36, 2006.
4. T. Jannson and A. Kostrzewski, "Real-Time Pre-ATR Video Data Reduction in Wireless Networks," SPIE Proc., vol. 6234-22, 2006.
5. Piotr step'c, Marek Doma'nski, "Video Frame Segmentation Using Competitive Contours", Eusipco 2005.
6. B. S. Manjunath, P. Salembier, and T. Sikura, (eds.), Introduction to MPEG-7, Wiley, 2002.
7. Analog Devices vide codec chips including ADV202, ADV601, ADV611/612' http://www.analog.com/en/cat/0,2878,765,00.html.
8. J. W. Goodman, Introduction to Fourier Optics, 2nd ed., McGraw-Hill, 1988.
9. T. Jannson, D. H. Kim, A. A. Kostrzewski, and V. T. Tarnovskiy, "Soft Computing and Soft Communication (SC2) for Synchronized Data," Invited Paper, SPIE Proc., vol. 3812, pp. 55-67, 1999.
10. Gerald Sommer, "Applications of Geometric Algebra in Robot Vision", Computer Algebra and Geometric Algebra with Applications, Volume 3519, 2005.
11. W. Y. Ma and B. S. Manjunath, "Edge Flow: A Framework of Boundary Detection and Image Segmentation," IEEE Computer Vision and Pattern Recognition, 1997.
12. Canny, J., A Computational Approach To Edge Detection, IEEE Trans. Pattern Analysis and Machine Intelligence, 8:679-714, 1986.
13. T. Jannson, "Bayesian Inference and Conditional Possibilities as Performance Metrics for Homeland Security Sensors," SPIE Proc., pp. 6538-39, 2007.
14. C. Xu and J. L. Prince, "Gradient Vector Flow Deformable Models", Handbook of Medical Imaging, edited by Isaac Bankman, Academic Press, September, 2000.
15. R. C. Gonzalez and R. E. Woods, Digital Image Processing ($2^{nd}$ Edition), 2002.
16. Von Altrock C., Fuzzy Logic and NeuroFuzzy Applications Explained (2002), ISBN 0-13-368465-2.
17. J. Portilla, "Image Restoration Using Gaussian Scale Mixtures in Overcomplete Oriented Pyramids," SPIE Proc., vol. 5914-50, 2005.
18. Geometric Invariance in Computer Vision by Mundy et al, The MIT Press 1992.

We claim:

1. A method of determining an object contour in an image frame of a video employed in a video processing system, the method comprising:
   determining a phase space representation of the image frame;
   selecting a phase space filter from a set of phase space filters according to an estimated size of the object, wherein the set of phase space filters comprises phase space filters having a plurality of different phase space scale responses;
   scaling the phase space representation using the selected phase space filter;
   discarding redundant points of the scaled phase space representation to form a filtered frame;
   comparing the filtered frame with a reference frame to determine an approximate object contour; and
   storing the approximate object contour on a computer readable medium.

2. The method of claim 1, wherein the phase space filters comprise filters having fractional cut-off frequencies of the form m(1/2n).

3. The method of claim 2, further comprising comparing the approximate object contour with a reference object contour to classify an object corresponding to the approximate object contour.

4. The method of claim 3, wherein the step of determining an approximate object contour comprises determining a plurality of approximate object contours corresponding to a plurality of objects and wherein the step of classifying the object comprises classifying the objects of the plurality of objects.

5. The method of claim 4, further comprising determining a plurality of regions of the image frame corresponding to the plurality of objects and compressing the regions of the image frame according to their corresponding classifications.

6. The method of claim 5, wherein the first image signature comprises a texture determined from a high frequency portion of the phase space.

7. The method of claim 5, wherein the step of compressing the regions comprises compressing a region corresponding to an object of a predetermined class of objects such that an identifiable feature is removed from the object of the predetermined class.

8. The method of claim 5, wherein the step of compressing the regions comprises locating a well-structured region in the frame and locating the well-structured region in a previous frame and characterizing the well-structured region in the frame as an algebraic transformation of the well structured region in the previous frame.

9. The method of claim 8, wherein the algebraic transformation comprises a scaled affine transformation.

10. The method of claim 5, wherein a region comprises a background; and further comprising watermarking the background.

11. The method of claim 10, wherein the step of watermarking comprises modifying a predetermined number of bits of a binary representation of a color of a pixel of the background.

12. The method of claim 5, wherein compressing a region of the plurality of regions comprises:
 performing wavelet decomposition on the region to determine a low resolution representation of the region and a plurality of wavelet coefficients; and
 representing the plurality of wavelet coefficients as a Gaussian scale mixture.

13. The method of claim 5, wherein the plurality of regions are compressed using compression ratios selected from a plurality of region compression ratios such that the image frame is compressed at a predetermined frame compression ratio.

14. The method of claim 1, wherein the phase space representation comprises a phase space representation of an image signature of the image frame.

15. The method of claim 14, wherein the image signature comprises an array of distances between image pixels or groups of image pixels and a reference, wherein the distances are determined using a predetermined metric corresponding to the image signature.

16. The method of claim 15, wherein the image signature is further determined using a second image signature, wherein the second image signature comprises an array of distances between image pixels or groups of image pixels and a second reference, wherein the distances of the second array are determined using a second predetermined metric corresponding to the second image signature.

17. The method of claim 16, wherein the first image signature or the second image signature comprises a flow of a speed vector field, a flow of a color vector field, or a texture field.

18. The method of claim 16, wherein the first image signature or the second image signature comprises a flow of a speed vector field, a flow of a color vector field, a texture field, a full-color spectral field, or a motion trajectory field.

19. The method of claim 1, wherein the reference frame comprises a filtered frame determined from a preceding image frame of the video.

20. The method of claim 19, wherein the object size is estimated using an object classified in a previous image frame of the video image.

21. The method of claim 1, wherein the reference frame comprises a texture frame determined using the selected phase space filter.

* * * * *